United States Patent
Yun et al.

(10) Patent No.: US 10,082,893 B2
(45) Date of Patent: Sep. 25, 2018

(54) INPUT DEVICE, ELECTRONIC DEVICE INCLUDING THE SAME, AND CONTROL METHOD THEREOF

(71) Applicant: Samsung Electronics Co., Ltd., Gyeonggi-do (KR)

(72) Inventors: Hee-Young Yun, Gyeonggi-do (KR); Junhui Lee, Gyeonggi-do (KR); Hyung-Jin Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 187 days.

(21) Appl. No.: 15/054,912

(22) Filed: Feb. 26, 2016

(65) Prior Publication Data

US 2016/0252979 A1 Sep. 1, 2016

(30) Foreign Application Priority Data

Feb. 27, 2015 (KR) .................. 10-2015-0027927

(51) Int. Cl.
| | |
|---|---|
| G06F 3/0362 | (2013.01) |
| G06F 1/16 | (2006.01) |
| G01D 5/56 | (2006.01) |
| G01D 5/14 | (2006.01) |
| G01D 5/28 | (2006.01) |
| G01D 5/58 | (2006.01) |
| G01D 7/00 | (2006.01) |

(52) U.S. Cl.
CPC .......... *G06F 3/0362* (2013.01); *G01D 5/145* (2013.01); *G01D 5/28* (2013.01); *G01D 5/56* (2013.01); *G01D 5/58* (2013.01); *G06F 1/163* (2013.01); *G01D 7/007* (2013.01)

(58) Field of Classification Search
None
See application file for complete search history.

(56) References Cited

U.S. PATENT DOCUMENTS

| | | | |
|---|---|---|---|
| 6,407,379 B1 * | 6/2002 | Shinbo | G01D 5/2457 250/231.13 |
| 7,102,123 B2 | 9/2006 | Chin et al. | |
| 7,417,422 B2 | 8/2008 | Kang | |
| 7,425,825 B2 | 9/2008 | Kang | |
| 7,468,603 B2 | 12/2008 | Kang et al. | |
| 7,602,268 B2 | 10/2009 | Miyasaka et al. | |
| 8,143,981 B2 | 3/2012 | Washizu et al. | |
| 2003/0224737 A1 * | 12/2003 | Yokoji | H01H 5/02 455/90.3 |

(Continued)

*Primary Examiner* — Amare Mengistu
*Assistant Examiner* — Sarvesh J Nadkarni
(74) *Attorney, Agent, or Firm* — The Farrell Law Firm, P.C.

(57) ABSTRACT

Disclosed is a device for entering an input through a rotary motion, including a rotating body, and a fixed body to which the rotating body is coupled and rotates, wherein a first magnetic material and a second magnetic material are disposed on the rotating body and the fixed body, respectively, such that a clicking sensation to the rotation of the rotating body is generated by a magnetic force between the first and second magnetic materials, and an optical sensor and one or more magnetic sensors are disposed on the fixed body such that an amount, a direction, or a speed of rotation of the rotating body is recognized by the optical sensor, and wherein the one or more magnetic sensors detect the magnetic force.

17 Claims, 20 Drawing Sheets

(56) References Cited

U.S. PATENT DOCUMENTS

2007/0222343 A1* 9/2007 Kang ............... G06F 3/016
                                                310/68 R
2016/0176292 A1* 6/2016 Blaesing ........... B60K 35/00
                                                335/219
2016/0305795 A1* 10/2016 Eisenbeis .......... G01D 7/007

* cited by examiner

1307

| CLOCKWISE ROTATION | | | COUNTERCLOCKWISE ROTATION | | |
|---|---|---|---|---|---|
| State | IC No. 1 | IC No. 2 | State | IC No. 1 | IC No. 2 |
| 1 | 0 | 0 | 1 | 0 | 0 |
|   | 1 | 1 |   | 0 | 1 |
| 2 | 0 | 1 |   | 1 | 1 |
|   | 1 | 1 | 2 | 0 | 1 |
| 3 | 1 | 0 |   | 1 | 1 |
|   | 1 | 1 | 3 | 1 | 0 |
|   | 1 | 0 |   | 1 | 1 |
| 4 | 0 | 0 | 4 | 0 | 0 |

INPUT DEVICE, ELECTRONIC DEVICE INCLUDING THE SAME, AND CONTROL METHOD THEREOF

PRIORITY

This application claims priority under 35 U.S.C. § 119(a) to Korean Patent Application Serial no. 10-2015-0027927, which was filed in the Korean Intellectual Property Office on Feb. 27, 2015, the contents of which are incorporated herein by reference.

BACKGROUND OF THE DISCLOSURE

1. Field of the Disclosure

The present disclosure relates generally to an electronic device, and more particularly, to an electronic device that has a device for entering an input through a rotary motion.

2. Description of the Related Art

Electronic devices have generally decreased in size, enhancing portability. Although many compact electronic devices are transported while in users' pockets, others may be worn on the wrist or on a particular part of a human body the head, neck, or arm. Such devices may be referred to as wearable devices.

Wearable devices may generally include a main body, which performs the original function of an electronic device, and a connecting body, such as a strap, which extends from the main body by a predetermined length and secures the main body to a human body or a structure.

Such wearable devices may be used independently or in conjunction with other electronic devices while being subordinated thereto. When wearable devices are used while being subordinated to other electronic devices, communication schemes through short-range communication modules may be adopted, and the wearable devices may reduce the cumbersome and frequent use of the other electronic devices.

Wearable devices have a limitation in implementing the functions thereof because they are formed to be relatively compact and slim. Accordingly, wearable devices are required to efficiently implement various UI functions in hardware or software.

Wearable electronic devices in the related art include various physical input devices therearound as an input means, in addition to a touch-type display.

Input devices employed for electronic devices in the related art may use any of a method of recognizing the rotation of a rotating body by using a magnet and a Hall IC, a method of recognizing an optical pattern of a rotating body through an optical module that includes a light emitting part and a light receiving part, or a method of recognizing the rotation of a rotating body by using a mechanical switch device. One of these three methods may be generally selected and used for input devices according to the purpose of use of electronic devices and the characteristics of UIs.

However, when optical sensing devices are used, although it is possible to continuously recognize rotation in detail according to a degree of image analysis, a large amount of power may be consumed due to the complexity and the frequency of use of the image analysis process.

When Hall IC type sensing devices are used, since a plurality of magnets and at least two Hall ICs are required, a mounting space becomes narrower as compared with the optical type, and rotation is discontinuously recognized according to the output levels of the Hall ICs so that the usability may be deteriorated when the Hall IC type sensing devices are applied to delicate UIs.

In order to make up for the problem and generate a click feeling when a user rotates a bezel, if a plurality of magnets are mounted, and Hall ICs and an optical sensing device are installed together in a terminal, a component arrangement structure for effectively utilizing a narrow space is required, and a design method for interworking between the optical sensing device and the Hall ICs is also required.

SUMMARY OF THE DISCLOSURE

The present disclosure has been made to address the above-mentioned problems and disadvantages, and to provide at least the advantages described below.

Accordingly, an aspect of the present disclosure is to provide a device with an excellent component mounting property.

Another aspect of the present disclosure is to provide a device and method in which an optical sensor and one or more magnetic sensors are mounted together, and a rotation recognition value of the optical sensor can be corrected by using the magnetic sensors while a clicking sensation to the rotation is being provided.

According to an aspect of the present disclosure, an electronic device includes a rotating body, and a fixed body to which the rotating body is coupled and rotates, wherein a first magnetic material and a second magnetic material are disposed on the rotating body and the fixed body, respectively, such that a clicking sensation to the rotation of the rotating body is generated by a magnetic force between the first and second magnetic materials, and an optical sensor and one or more magnetic sensors are disposed on the fixed body such that an amount, a direction, or a speed of rotation of the rotating body is recognized by the optical sensor, and wherein the one or more magnetic sensors detect the magnetic force.

According to another aspect of the present disclosure, a device for controlling an electronic device includes an optical sensor that receives an optical signal reflected from a rotating body in a rotary motion, a magnetic sensor that detects a magnetic force of at least one magnet attached to the optical sensor and that generates a magnetic force signal using the detected magnetic force, and a controller that estimates a rotation value of the rotating body based on the optical signal, estimates an auxiliary rotation value of the rotating body based on the magnetic force signal, determines a final rotation value by reflecting the auxiliary rotation value in the rotation value, and determines a mode of the electronic device according to the final rotation value.

According to another aspect of the present disclosure, a method of controlling an electronic device includes estimating a rotation value of a rotating body based on an optical signal reflected from the rotating body in a rotary motion, estimating an auxiliary rotation value of the rotating body based on a signal obtained by detecting a magnetic force of at least one magnet attached to the rotating body, determining a final rotation value by reflecting the auxiliary rotation value in the rotation value, and controlling the electronic device according to the final rotation.

According to another aspect of the present disclosure, an electronic device includes an outer housing that has a first surface, and a second surface opposite to the first surface, an opening formed in the first surface, a bezel that surrounds an outer periphery of the opening and is rotatably supported by the first surface, and at least one electronic component accommodated in the outer housing, wherein the bezel comprises one or more magnets disposed separate from each other and a pattern formed on a surface of the bezel that is directed towards the outer housing, and wherein the outer housing comprises a part adjacent to the bezel, the part including at least one magnetic force detection sensor that detects the one or more magnets and an optical sensor that optically detects the pattern.

BRIEF DESCRIPTION OF THE DRAWINGS

The above and other aspects, features, and advantages of the present disclosure will be more apparent from the following detailed description taken in conjunction with the accompanying drawings, in which:

FIG. 14 is a signal table illustrating the operating method of the magnetic sensor, such as a Hall IC, according to embodiments of the present disclosure;

DETAILED DESCRIPTION OF EMBODIMENTS OF THE DISCLOSURE

Figure 1:
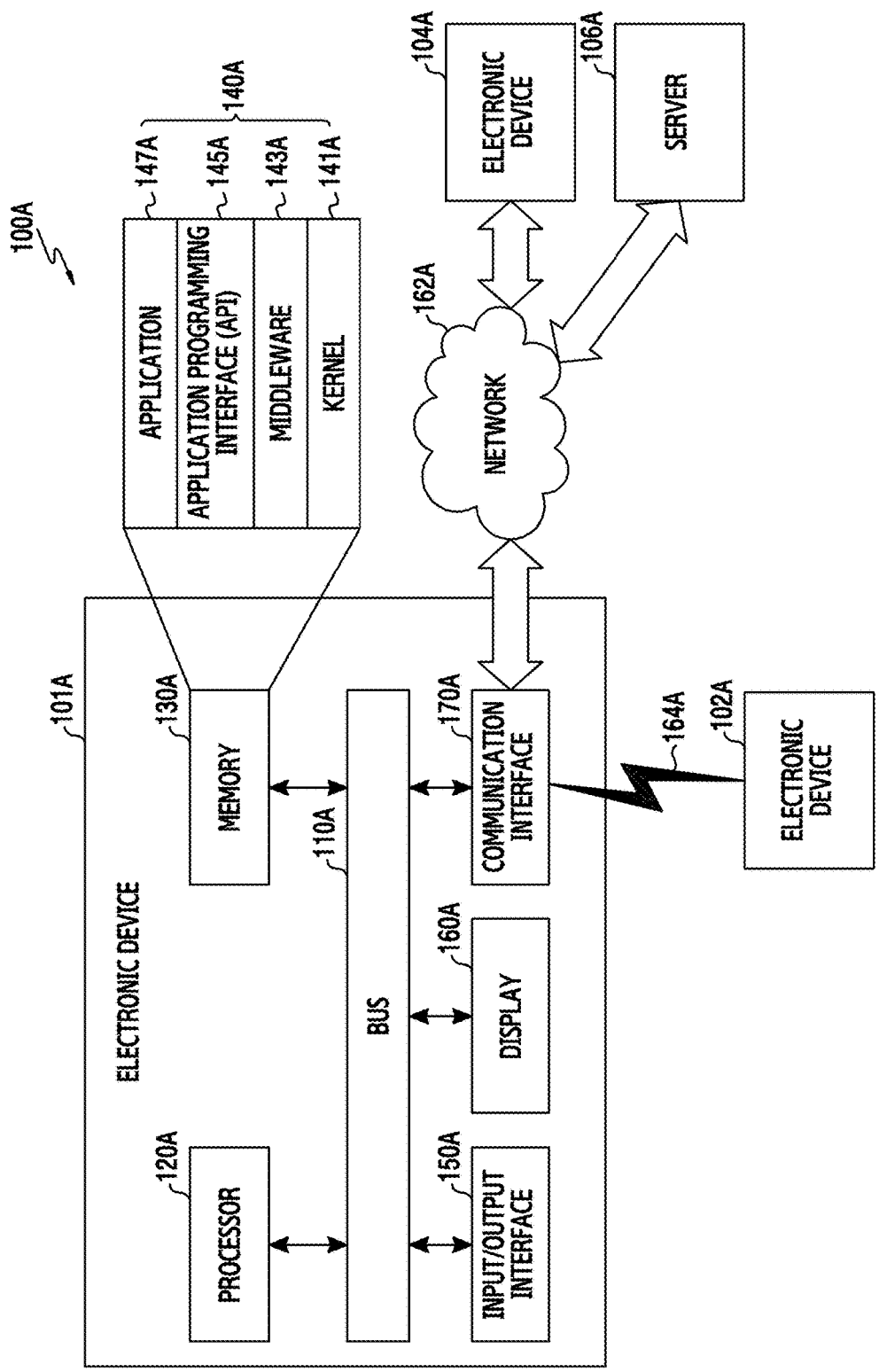
FIG. 1 illustrates an electronic device in a network environment according to embodiments of the present disclosure.

Embodiments of the present disclosure will be described with reference to the accompanying drawings. The disclosure may be modified, and specific examples are described and related detailed descriptions are made in the specification. However, it should be understood that the embodiments of the disclosure are not limited to a specific embodied form and include all modifications and/or equivalents or substitutions that fall within the spirit and technical scope of the disclosure. In the drawings, like reference numerals are used for like elements.

Expressions such as "include" or "may include", etc. that may be used in the disclosure indicate existence of a disclosed relevant function, operation, or element, etc., and do not limit additional one or more functions, operations, or elements, etc. Also, it should be understood that terminologies such as "include" or "have", etc. in the disclosure are intended for designating existence of a characteristic, a number, a step, an operation, an element, a part, or a combination of these described on the specification and do not exclude in advance existence or addition possibility of one or more other characteristics, numbers, steps, operations, elements, parts, or a combination of these.

Expression such as "or", etc. in the disclosure includes a certain and all combinations of words listed together. For example, "A or B" includes only A and includes only B, or includes both A and B.

In the disclosure, expressions such as "1st", "2nd", "first" or "second", etc. may modify various elements of the disclosure but do not limit relevant elements. For example, the expressions do not limit sequence and/or importance, etc. of relevant elements. The expressions may be used for discriminating one element from another element. For example, both a first user apparatus and a second user apparatus are all user apparatuses, and represent different user apparatuses. For example, a first element may be referred to as a second element without departing from the scope of the disclosure, and similarly, the second element may be referred to as the first element.

When it is mentioned that a certain element is "connected to" or "accesses" another element, it should be understood that the element may be directly connected to another element or may directly access another element, but still another element may exist in the middle. In contrast, when it is mentioned that a certain element is "directly connected to" or "directly accesses" another element, it should be understood that still another element does not exist in the middle.

Terms used in this disclosure are used for explaining only a specific example and is not intended to limit the disclosure. Unless clearly expressed otherwise, expression of the singular includes expression of the plural.

Unless defined differently, all terms used herein including technological or scientific terminologies have the same meaning as that generally understood by a person of ordinary skill in the art to which the disclosure belongs. It should be understood that generally used terms defined by a dictionary have the meanings consistent with meaning as used in a related technology, and unless clearly defined in the disclosure, they are not to be understood as an ideal or excessively formal meaning.

An electronic device of the present disclosure may be a device including a communication function. For example, an electronic device includes at least one of a smartphone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, or a wearable device, such as a head-mounted-device (HMD) including electronic glasses, an electronic clothing, an electronic bracelet, an electronic necklace, an electronic appcessory, an electronic tattoo, or a smartwatch.

According to certain examples, an electronic device may be a smart home appliance having a communication function. A smart home appliance includes at least one of a television, a digital video disk (DVD) player, an audio, a refrigerator, an air conditioner, a cleaner, an oven, an electronic range, a washing machine, an air purifier, a set-top box, a TV box, such as Samsung HomeSync™, Apple TV™, or Google TV™, game consoles, an electronic dictionary, an electronic key, a camcorder, or an electronic frame.

According to certain examples, an electronic device includes at least one of various medical devices, such as magnetic resonance angiography (MRA), magnetic resonance imaging (MRI), computed tomography (CT), a shooting device, or an ultrasonic device, a navigation device, a global positioning system (GPS) receiver, an event data recorder (EDR), a flight data recorder (FDR), an automobile infotainment device, electronic equipment for a ship, such as a navigation device for a ship or a gyro compass, avionics, a security device, or a robot for an industrial or home use.

According to certain examples, an electronic device includes at least one of a furniture or a portion of a building/structure including a communication function, an electronic board, an electronic signature receiving device, a projector, or various measurement devices, such as waterworks, electricity, gas, or a radio wave measuring device. An electronic device according to the disclosure may be a combination of one or more of the above-described devices. Also, it will be apparent to one skilled in the art that the electronic device examples of the disclosure are not limited to the above-described devices.

A terminology of a user used in embodiments of the present disclosure may indicate a person who uses an electronic device or a device, such as an artificial intelligence electronic device that uses the electronic device.

FIG. 1 illustrates a network environment 100A including an electronic device 101A according to embodiments of the present disclosure. Referring to FIG. 1, the electronic device 101A includes a bus 110A, a processor 120A, a memory 130A, an input/output (I/O) interface 150A, a display 160A, and a communication interface 170A.

The bus 110A may be a circuit for connecting the above-described elements with each other, and transferring communication, such as a control message, between the above-described elements.

The processor 120A includes a central processing unit (CPU), a communication processor (CP), or a graphic processing unit (GPU), for example.

The processor 120A receives an instruction from the above-described other elements via the bus 110A, deciphers the received instruction, and executes an operation or a data process corresponding to the deciphered instruction.

The memory 130A stores an instruction or data received from the processor 120A or other elements, such as the I/O interface 150A, the display 160A, or the communication interface 170A, or generated by the processor 120A or other elements. The memory 130A includes programming modules 140A such as a kernel 141A, a middleware 143A, an application programming interface (API) 145A, and applications 147A. The each of the programming modules may be configured using one or a combination of two or more of software, firmware, and hardware.

The kernel 141A controls or manages system resources, such as the bus 110A, the processor 120A, or the memory 130A, used for executing an operation or a function implemented in the rest of the programming modules such as the middleware 143A, the API 145A, or the applications 147A. The kernel 141A provides an interface for allowing the middleware 143A, the API 145A, or the applications 147A to access, control and manage an individual element of the electronic device 101A.

The middleware 143A performs a mediation role so that the API 145A or the application 147 may communicate with the kernel 141A to give and take data. In connection with task requests received from the applications 147A, the middleware 143A performs a control function, such as scheduling or load balancing) for a task request using a method of assigning priority that may use a system resource of the electronic device 101A, to at least one application 134A.

The API 145A allows the applications 147A to control a function provided by the kernel 141A or the middleware 143A, and includes at least one interface or function, such as for file control, window control, image processing, or character control.

The applications 147A include a short message service/multimedia messaging service SMS/MMS, e-mail, calendar, alarm, health care, such as an application for measuring quantity of motion or blood sugar, or an environment information application, such as an application providing atmospheric pressure, humidity or temperature information. Additionally or alternatively, the applications 147A may be related to information exchange between the electronic device 101A and an external electronic device. The application related to the information exchange includes a notification relay application for transferring specific information to the external electronic device or a device management application for managing the external electronic device, for example.

The notification relay application includes a function for transferring notification information generated from a different application of the electronic device 101A to an external electronic device. Additionally or alternatively, the notification relay application may receive notification information from an external electronic device and provide the same to a user. The device management application installs, deletes, or updates a function, such as turn-on/turn-off or luminance control of a display of an external electronic device communicating with the electronic device 101A and an application operating in the external electronic device or a service, such as a communication or message service provided by the external electronic device.

The applications 147A include a designated application depending on an attribute of the external electronic device. For example, when the external electronic device is a motion pictures experts group layer audio 3 (MP3) player, the applications 147A include an application related to music reproduction. Similarly, when the external electronic device is a mobile medical health care device, the applications 147A include an application related to health care. The applications 147A include at least one of an application designated in the electronic device 101A and an application received from the external electronic device, such as the server 106 or the electronic device 102A or 104A.

The I/O interface 150A transfers an instruction or data input from a user via an I/O unit to the processor 120A, the memory 130A, or the communication interface 170A via the bus 110A, for example. The I/O interface 150A provides data regarding a user's touch input via the touchscreen to the processor 120A, and outputs an instruction or data received via the bus 110A from the processor 120A, the memory 130A, or the communication interface 170A via the I/O unit. For example, the I/O interface 150A outputs voice data processed by the processor 120A to a user via a speaker.

The display 160A includes a liquid crystal display (LCD), a light emitting diode (LED) display, an organic light emitting diode (OLED) display, a micro electro mechanical system (MEMS) display, or an electronic paper display. The display 160A displays various types of contents for users, such as text, images, videos, icons, or symbols. The display 160A includes a touch screen that receives a touch, gesture, proximity, or hovering input by using an electronic pen or a part of the user's body.

The display 160A displays a contact list based on a priority of each of the contacts included in the contact list. For example, the priority of the contacts may be determined based on at least one of a transmission history, transmission frequency, transmission speed, charging policy, intimacy, counterpart's location, schedule, or application preference.

The display 160A displays a service list based on a priority of each of the applications or services included in the service list, such as configuration information of a service provider or manufacturer, contact information, application preference, user preference, a use time point, a distance from a target to share contents, a transmission history, and a charging policy.

The communication interface 170A provides communication between the electronic device 101 and an external device. For example, the communication interface 170A may be connected to a network 162A through wireless communication or wired communication, and may communicate with an external device.

The wireless communication may use at least one of long term evolution (LTE), LTE-advanced (LTE-A), code division multiple access (CDMA), wideband CDMA (WCDMA), universal mobile telecommunications system (UMTS), WiBro (Wireless Broadband), and global system for mobile communications (GSM) as a cellular communication protocol.

The wireless communication includes at least one of WiFi, Bluetooth™, BLE, Zigbee™, Infrared (IR) communication, and ultrasonic communication as a short-range communication protocol 164A.

The wired communication includes at least one of universal serial bus (USB), high definition multimedia interface (HDMI), recommended standard 232 (RS-232), and plain old telephone service (POTS).

The network 162A includes at least one of communication networks such as a computer network, including a local area network (LAN) or a wide area network (WAN), the Internet, and a telephone network.

The electronic devices 102A and 104A may be the same type as or different than the electronic device 101A. The server 106A includes a group of one or more servers. According to embodiments, all or some of the operations executed in the electronic device 101A may be performed in another electronic device or a plurality of electronic devices. For example, when the electronic device 101 should perform some functions or services automatically or by a request, the electronic device 101 makes a request for performing at least some functions related to the functions or services to another device instead of performing the functions or services by itself or in addition to itself. The electronic device performs the functions requested by the electronic device 101A or additional functions and provides results thereof to the electronic device 101A. The electronic device 101A provides the requested functions or services to another electronic device based on the received results or after additionally processing the received results. To this end, cloud, distributed, or client-server computing technology may be used.

Figure 2:
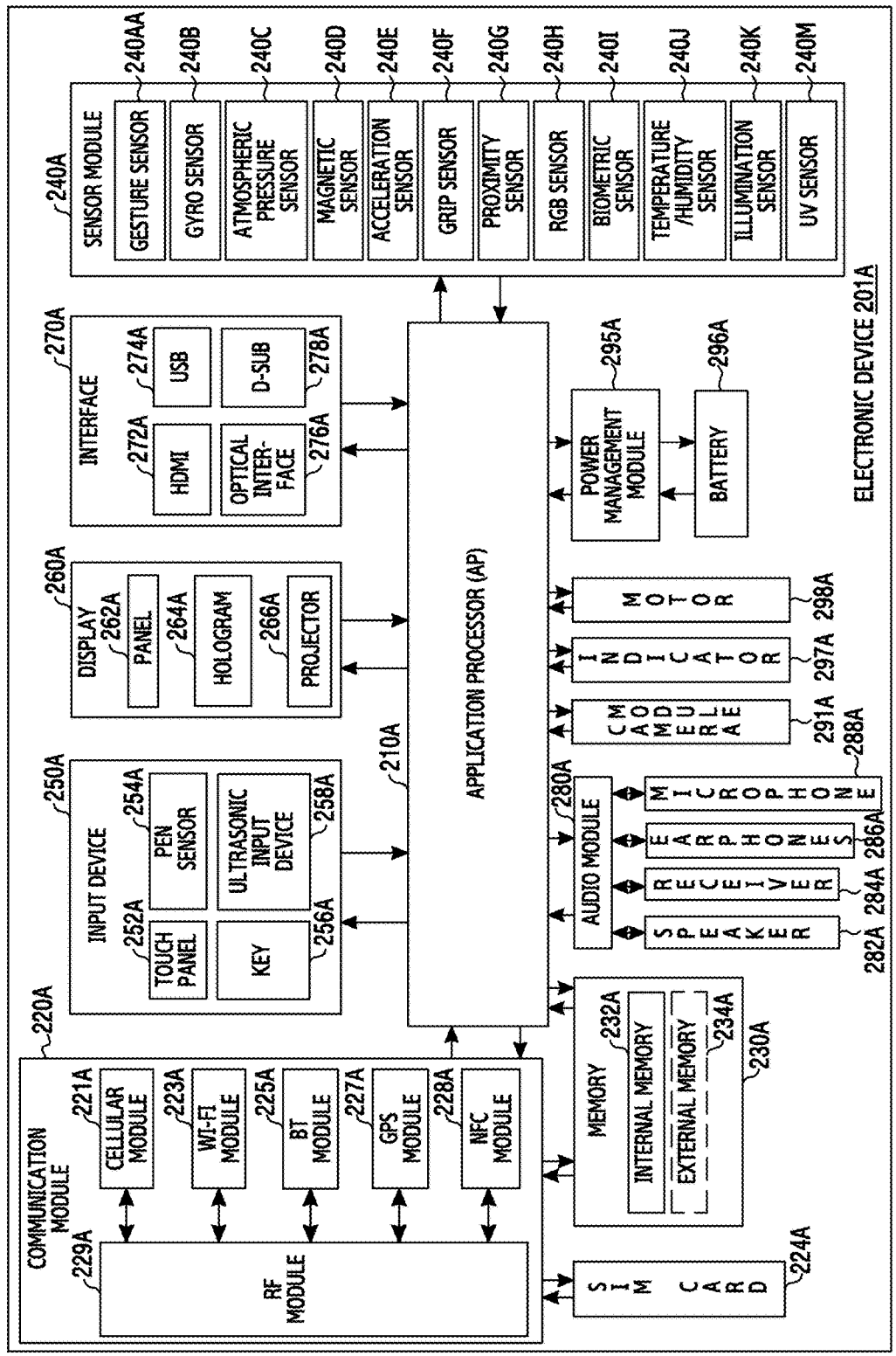
FIG. 2 is a block diagram of an electronic device according to embodiments of the present disclosure.

FIG. 2 is a block diagram illustrating an example electronic device 201A according to embodiments of the present disclosure. The electronic device 201A includes all or some of the components of the electronic device 100A illustrated in FIG. 1. The electronic device 201A includes one or more processors, such as AP 210A, a communication module 220A, a subscriber identity module 224A, a memory 230A, a sensor module 240A, an input device 250A, a display 260A, an interface 270A, an audio module 280A, a camera module 291A, a power management module 295A, a battery 296A, an indicator 297A, and a motor 298A.

The processor 210A drives an OS or an application program to control a plurality of hardware or software components connected to the processor 210A and to perform a variety of data processing and operations. The processor 210A may be implemented in a system on chip (SoC), and may further include a graphic processing unit (GPU) and/or an image signal processor.

The communication module 220A performs data transmission/reception in communication between the electronic device 201A and other electronic devices connected via a network. The communication module 220A includes a cellular module 221, a Wi-Fi module 223A, a Bluetooth™ (BT) module 225A, a GPS module 227A, a near-field communication (NFC) module 228A, and a radio frequency (RF) module 229A.

The cellular module 221A provides voice communication, image communication, a short message service, or an Internet service, for example, via a communication network, such as LTE, LTE-A, CDMA, WCDMA, UMTS, WiBro, or GSM. The cellular module 221A performs discrimination and authentication of an electronic device within a communication network using a subscriber identity module (SIM) card 224A. The cellular module 221A performs at least a portion of functions that may be provided by the processor 210A, such as a portion of a multimedia control function.

The cellular module 221A includes a communication processor (CP) and may be implemented as an SoC. Though elements such as the cellular module 221A, the memory 230A, and the power management module 295A are illustrated as elements separated from the processor 210A in FIG. 2 The processor 210A may be implemented to include fewer than all of the above-described elements.

The processor 210A or the cellular module 221A connects a second communication for an Internet service with another electronic device by using a first communication connection for a screen sharing or mirroring service with the electronic device 102A. The processor 210A or the cellular module provides the screen sharing service and the Internet service with the electronic device 102A by using the second communication connection.

The processor 210A or the cellular module 221A loads an instruction or data received from at least one of a non-volatile memory and other elements connected thereto onto a volatile memory, and processes the instruction or data. The processor 210A or the cellular module 221A stores data received from at least one of other elements or generated by at least one of other elements in a non-volatile memory.

Each of the Wi-Fi module 223A, the BT module 225A, the GPS module 227A, or the NFC module 228A includes a processor for processing data transmitted/received via a relevant module. Though the cellular module 221A, the Wi-Fi module 223A, the BT module 225A, the GPS module 227A, or the NFC module 228A are illustrated as separate blocks in FIG. 2, at least two of these modules may be included in one integrated circuit (IC) or an IC package, and may be implemented as one SoC.

The RF module 229A performs transmission/reception of data transmission/reception of an RF signal. The RF module 229A includes a transceiver, a power amp module (PAM), a frequency filter, or a low noise amplifier (LNA). The RF module 229A may further include a part for transmitting/receiving an electromagnetic wave on a free space in wireless communication such as a conductor or a conducting line. Though FIG. 2 illustrates the cellular module 221A, the Wi-Fi module 223A, the BT module 225A, the GPS module 227A, and the NFC module 228A sharing one RF module 229A, at least one of these modules may perform transmission/reception of an RF signal via a separate RF module.

The SIM card 224A includes a subscriber identification module, and is insertable into a slot formed in a specific position of the electronic device. The SIM card 224A includes unique identity information, such as integrated circuit card identifier (ICCID) or subscriber information, such as international mobile subscriber identity (IMSI).

The memory 230A includes a built-in memory 232A or an external memory 234A. The built-in memory 232A includes at least one of a volatile memory, such as dynamic RAM (DRAM), static RAM (SRAM), and synchronous dynamic RAM (SDRAM), and a non-volatile memory, such as one time programmable ROM (OTPROM), programmable ROM (PROM), erasable and programmable ROM (EPROM), electrically erasable and programmable ROM (EEPROM), mask ROM, flash ROM, NAND flash memory, and NOR flash memory.

The built-in memory 232A may be a solid state drive (SSD). The external memory 234A may further include a flash drive such as compact flash (CF), secure digital (SD), micro secure digital (Micro-SD), mini secure digital (Mini-SD), extreme digital (xD), or a memory stick. The external memory 234A may be functionally connected with the electronic device 201A via various interfaces. The electronic device 201 may further include a storage device such as a hard drive.

The sensor module 240A measures a physical quantity or detects an operation state of the electronic device 201A, and converts the measured or detected information to an electric signal. The sensor module 240A includes at least one of a gesture sensor 240AA, a gyro sensor 240B, an atmospheric pressure sensor 240C, a magnetic sensor 240D, an acceleration sensor 240E, a grip sensor 240F, a proximity sensor 240G, a color sensor 240H, such as a red, green, blue (RGB) sensor), a biometric sensor 240I, a temperature/humidity sensor 240J, an illumination sensor 240K, and an ultra violet (UV) sensor 240M.

Additionally or alternatively, the sensor module 240 includes an E-nose sensor, an electromyography (EMG) sensor, an electroencephalogram (EEG) sensor, an electrocardiogram (ECG) sensor, an infrared (IR) sensor, an iris sensor, or a fingerprint sensor. The sensor module 240A may further include a control circuit for controlling at least one of these sensors.

The input device 250A includes a touch panel 252A, a (digital) pen sensor 254A, a key 256A, and an ultrasonic input device 258A. The touch panel 252A determines a touch input using at least one of capacitive, resistive, infrared, or ultrasonic methods, and further includes a control circuit. A capacitive touch panel performs detection by a physical contact or proximity recognition. The touch panel 252A may further include a tactile layer which provides a tactile reaction to a user.

The (digital) pen sensor 254A may be implemented using a method which is the same as or similar to receiving a user's touch input, or using a separate sheet for detection. The key 256A includes a physical button, an optical key or keypad. The ultrasonic input device 258A recognizes data by detecting a sound wave using a microphone 288 in the electronic device 201A via an input tool generating an ultrasonic signal, and enables wireless recognition. The electronic device 201A receives a user input from an external device, such as a computer or a server connected to the communication module 220A using the communication module 220A.

The display 260A includes a panel 262A, a hologram device 264A, and a projector 266A. The panel 262A may be a liquid crystal display (LCD) or an active-matrix organic light-emitting diode (AM-OLED), for example, and may be flexible, transparent, and/or wearable. The panel 262A may be configured as one module together with the touch panel 252A. The hologram device 264A displays a three-dimensional image in the air using light interference. The projector 266 projects light onto a screen to display an image. The screen may be positioned inside or outside the electronic device 201A. The display 260A may further include a control circuit for controlling the panel 262A, the hologram device 264A, or the projector 266A.

The interface 270A includes a high-definition multimedia interface (HDMI) 272A, a universal serial bus (USB) 274A, an optical interface 276A, and a d-subminiature (D-sub) 278A. The interface 270A may be included in the communication interface 170A illustrated in FIG. 1. Additionally or alternatively, the interface 270A includes a mobile high-definition link (MHL) interface, a secure digital (SD) card/multi-media card (MMC) interface, or an infrared data association (IrDA) standard interface.

The audio module 280A converts a sound and an electric signal in dual directions. At least a partial element of the audio module 280A may be included in the I/O interface 150A illustrated in FIG. 1. The audio module 280A processes sound information input or output via a speaker 282A, a receiver 284A, an earphone 286A, or a microphone 288A, for example.

The camera module 291A shoots still images and video. According to an embodiment, the camera module 291A includes one or more image sensors, such as a front or rear sensor, a lens, an image signal processor (ISP), or a flash, such as a light-emitting diode (LED) or xenon lamp.

The power management module 295A manages power of the electronic device 201 and includes a power management integrated circuit (PMIC), a charger integrated circuit (IC), and a battery and battery gauge, for example.

The PMIC may be mounted inside an integrated circuit or an SoC semiconductor. A charging method may be a wired or wireless charging method. The charging IC charges a battery and prevents introduction of an overvoltage or an overcurrent from a charger. The charging IC is for at least one of the wired charging method and the wireless charging method. The wireless charging method may be magnetic resonance, magnetic induction, or an electromagnetic wave method, and may include an additional circuit for wireless charging such as a coil loop circuit, a resonance circuit, or a rectifier.

The battery gauge measures the remaining power of the battery 296, voltage, current, or temperature while charging, stores or generates electricity, and supplies power to the electronic device 201A using the stored or generated electricity. The battery 296A includes a rechargeable battery or a solar battery.

The indicator 297A displays a specific state of the electronic device 201A or a portion thereof a booting, message, or charging state. The motor 298A converts an electric signal to mechanical vibration. The electronic device 201A includes a processor for supporting a mobile TV, which processes media data corresponding to standards such as digital multimedia broadcasting (DMB), digital video broadcasting (DVB), or a media flow.

Each of the above-described component elements of hardware according to the disclosure may be configured with one or more components, and the names of the corresponding component elements may vary based on the type of electronic device. The electronic device according to embodiments of the present disclosure includes at least one of the aforementioned elements. Some elements may be omitted or additional elements may be further included in the electronic device. Some of the hardware components according to embodiments of the present, disclosure may be combined into one entity, which performs functions identical to those of the relevant components before the combination.

Figure 3:
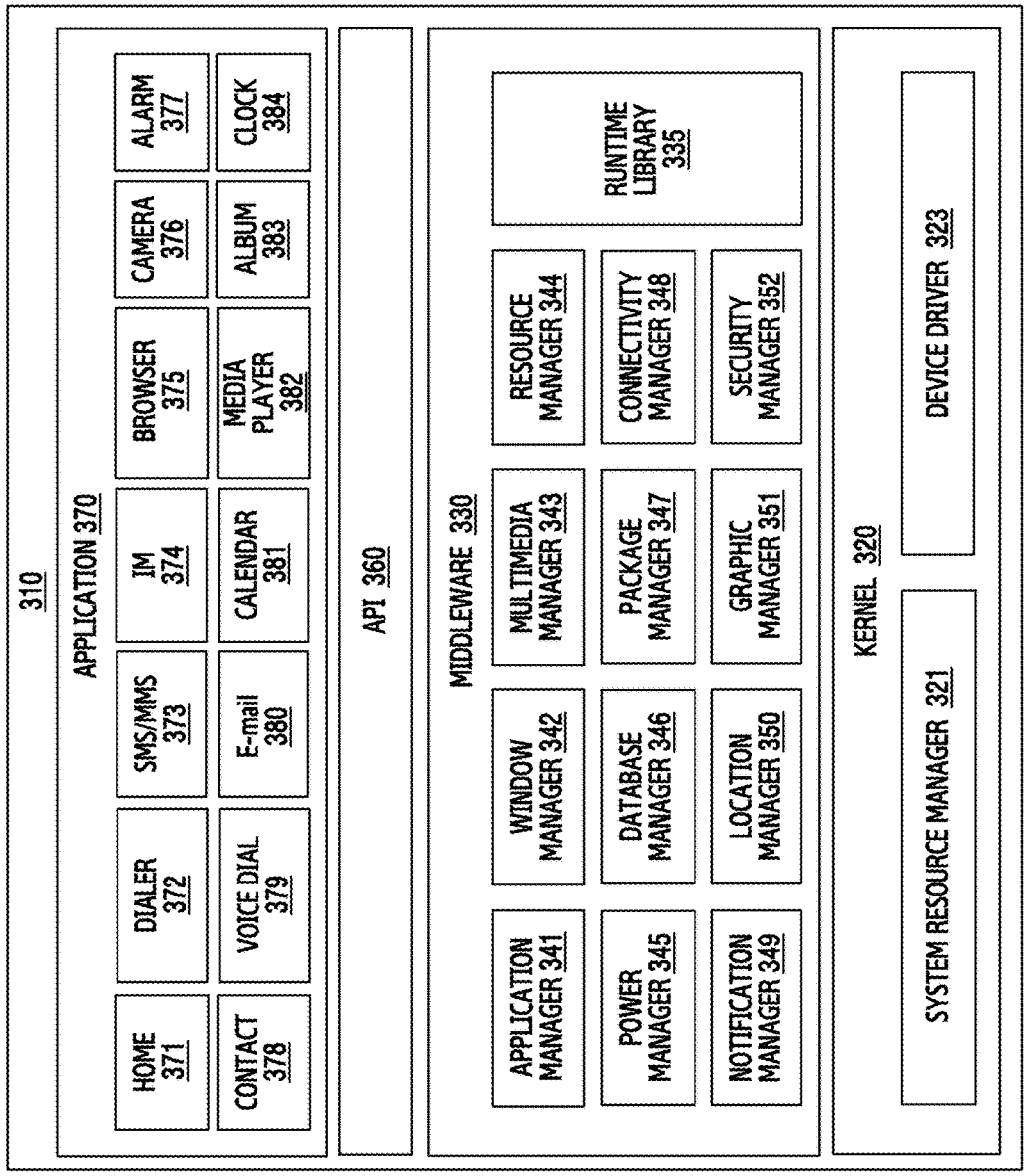
FIG. 3 is a block diagram of a program module according to embodiments of the present disclosure.

FIG. 3 is a block diagram 300 illustrating an example program module 310, according to embodiments of the present disclosure.

The program module 310 includes an operation system (OS) for controlling resources related to an electronic and/or various applications driven on the OS. For example, the OS may be Android, iOS, Windows, Symbian, Tizen, or Bada.

The program module 310 includes a kernel 320, middleware 330, an API 360, and/or applications 370. At least part of the program module 310 may be preloaded on the electronic device or downloaded from a server.

The kernel 320 includes a system resource manager 321 and a device driver 323. The system resource manager 321 controls, allocates or collects the system resources. The system resource manager 321 includes a process manager, a memory manager, and a file system manager, for example. The device driver 323 includes a display driver, a camera driver, a BT driver, a shared memory driver, a universal serial bus (USB) driver, a keypad driver, a WiFi driver, an audio driver, or an inter-process communication (IPC) driver, for example.

The middleware 330 provides functions which are commonly required by the applications 370 or provides various functions to the applications 370 through the API 360 such that the applications 370 can effectively use limited system resources in the electronic device. The middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

For example, the runtime library 335 includes a library module which is used by a compiler to add a new function through a programming language while the applications 370 are executed. The runtime library 335 performs functions on input/output management, memory management, and an arithmetic function, for example.

The application manager 341 manages a life cycle of at least one of the applications 370, for example. The window manager 342 manages GUI resources used in a screen. The multimedia manager 343 obtains a format necessary for reproducing various media files and encodes or decodes the media files by using a Codec suited to the corresponding format. The resource manager 344 manages resources such as a source code, a memory, or a storage space of at least one of the applications 370.

The power manager 345 operates along with a basic input/output system (BIOS) to manage a battery or power and provides power information necessary for operations of the electronic device. The database manager 346 generates, searches, or changes a database which is used in at least one of the applications 370. The package manager 347 manages installing or updating an application which is distributed in the form of a package file.

The connectivity manager 348 manages wireless connection of WiFi and Bluetooth™, for example. The notification manager 349 displays or notifies an event such as a message arrived, an appointment, a notification of proximity in such a manner that the event does not disturb the user. The location manager 350 manages location information of the electronic device. The graphic manager 350 manages a graphic effect to be provided to the user or a relevant user interface. The security manager 352 provides an overall security function necessary for system security or user authentication. According to an embodiment, when the electronic device is equipped with a telephony function, the middleware 330 may further include a telephony manager that manages a speech or video telephony function of the electronic device.

The middleware 330 includes a middleware module that forms a combination of the various functions of the above-described elements. The middleware 330 provides a module which is customized according to a type of OS to provide a distinct function. The middleware 330 may dynamically delete some of the existing elements or may add new elements.

The API 360 may be a set of API programming functions and may be provided as a different configuration according to an OS. For example, in the case of Android or IOS, a single API set may be provided for each platform. In the case of Tizen, two or more API sets may be provided.

The applications 370 include one or more applications for providing functions, such as home 371, dialer 372, short message service (SMS)/multimedia messaging service (MMS) 373, instant message (IM) 374, browser 375, camera 376, alarm 377, contact 378, voice dial 379, mail 380, calendar 381, media player 382, album 383, clock 384, health care, such as measuring exercise or a blood sugar, or environment information functions—such as information on atmospheric pressure, humidity, or temperature.

The applications 370 include an application for supporting information exchange between the electronic device and an external electronic device (hereinafter, an "information exchange application"). The information exchange application includes a notification relay application for relaying specific information to an external electronic device or a device management application for managing an external electronic device.

For example, the notification relay application includes a function of relaying notification information generated by other applications of the electronic device to an external electronic device. In addition, the notification relay application receives notification information from an external electronic device and may relay the same to the user. For example, the device management application, such as installs, deletes or updates at least one function of an external electronic device communicating with the electronic device, such as turning on/off all or part of an external electronic device or adjusting resolution of a display, an application operating in the external electronic device or a service provided by the external electronic device, such as a calling or message service.

The applications 370 include an application which is specified according to an attribute indicating a type of electronic device, include an application received from an external electronic device, and include a preloaded application or a third party application which may be downloaded from a server. The names of the elements of the program module 310 according to the illustrated examples may be changed according to a type of OS.

According to embodiments, at least part of the program module 310 may be implemented by software, firmware, hardware, e.g., electronic circuitry, or a combination of two or more of them. At least part of the program module 310 may be implemented by a processor. At least part of the program module 310 includes a module, a program, a routine, sets of instructions, or a process to perform one or more functions, for example.

Figure 4:
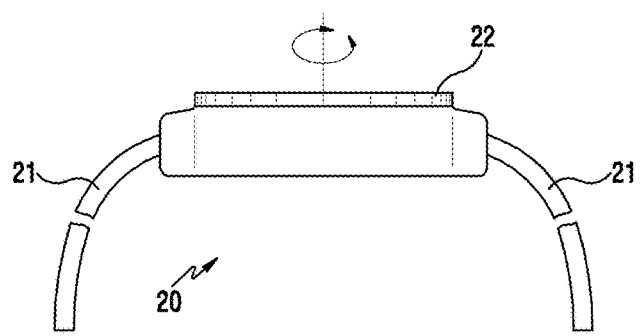
FIG. 4 is a side view of an electronic device according to embodiments of the present disclosure.

FIG. 4 is a side view of an electronic device according to embodiments of the present disclosure.

Referring to FIG. 4, the electronic device is illustrated as a wearable device that may be worn on a user's wrist. The electronic device includes a main body 20 and a connecting part 21, such as a strap or a band that is fastened to the main body 20. According to an embodiment, the electronic device may be worn on the user's wrist in such a manner that the connecting part 21 is wound around the wrist while the main body 20 is placed on the wrist. The connecting part 21 has a plurality of openings formed therein at a predetermined interval for adjusting the wearing position in accordance with the user's wrist. The connecting part 21 may be formed of at least one of metal, leather, rubber, silicone, and urethane. The connecting part 21 may be worn on a particular position of a human body, such as the neck, ankle, or wrist. The main body 20 may have a substantially cylindrical shape, and a rotating body 22 that can control various user interface (UI) environments may be disposed on the upper surface of the main body 20. The user rotates the rotating body 22 to provide the various UI environments.

Figure 5:
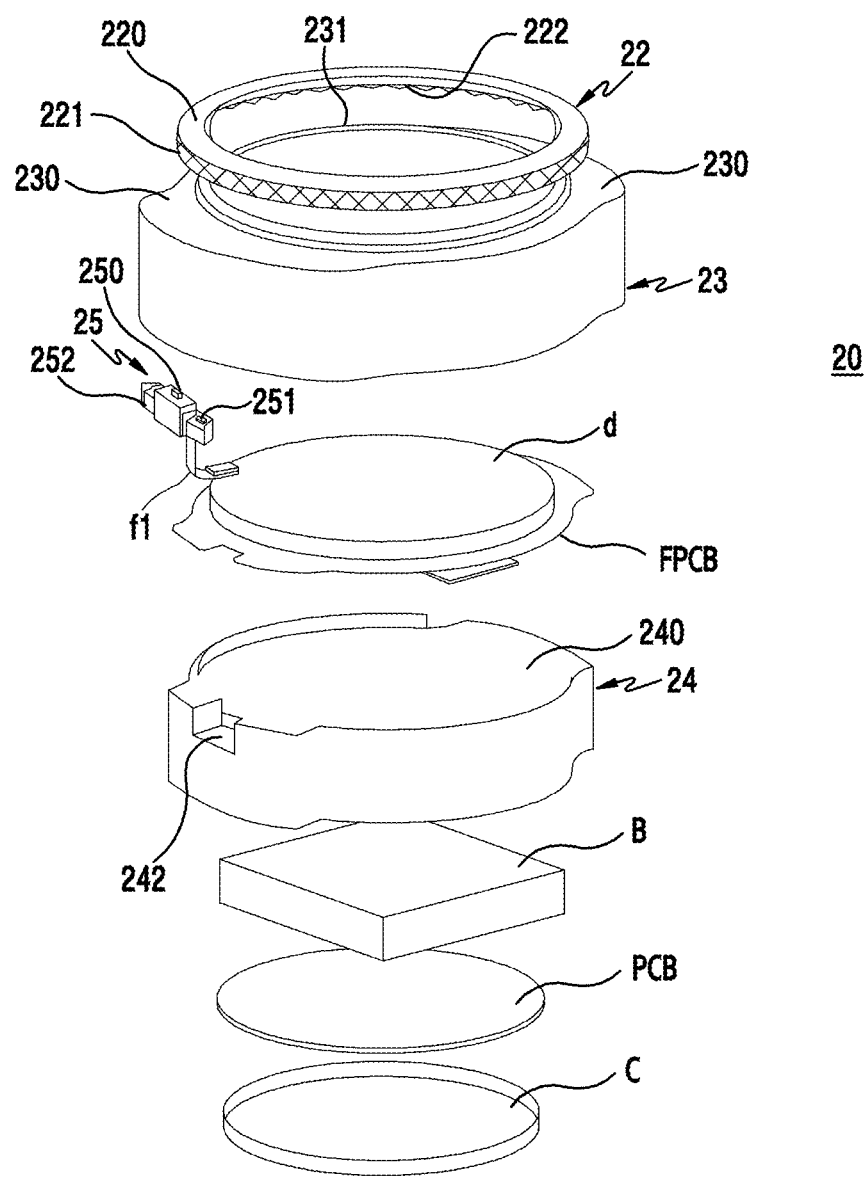
FIG. 5 is an exploded perspective view of the electronic device according to the embodiments of the present disclosure, where a strap is omitted.

FIG. 5 is an exploded perspective view of the electronic device according to the embodiments of the present disclosure. In FIG. 5, the main body is illustrated without the strap.

Referring to FIG. 5, the electronic device includes a display (d), such as a touch screen. The display (d) includes a flat display module or a curved display module. The display (d) may be disposed in an opening that is formed in the center of a first support structure, which will be described below.

The electronic device may use a battery B as a power supply means. The power supply means B may be mounted on a circuit component mounting part, such as the printed circuit board (PCB) formed of a hard material.

The electronic device includes the rotating body 22 that is installed so as to be rotatable in the main body. The rotating body 22 rotates to perform various input operations, has a substantially annular shape and is disposed to surround the outer periphery of the display (d). The rotating body 22 may also be referred to as a rotating bezel.

When the electronic device is a wrist-wearable electronic device, a rotary bezel type of rotating body 22 may be disposed thereon. The rotating body 22 rotates about the vertical axis in the clockwise or counterclockwise direction, up to 360 degrees or freely without any limitation.

The electronic device includes a sensor unit 25 that can detect the rotational position and the rotational direction of the rotating body 22. The function of the sensor unit 25 according to the rotation of the rotating body 22 may be automatically displayed on the display (d). The electronic device determines the direction, speed, rotated position, and amount of rotation of the rotating body 22, for example. The sensor unit 25 includes a plurality of sensors 250, 251, and 252, the optical sensor 250 and one or more magnetic force detection sensors, which could be 251 and 252.

The electronic device includes the rotating body 22 and support structures 23 and 24. The rotating body 22 may be rotatably mounted on the support structure 23, and the electronic device may be operated by the rotation of the rotating body 22. The rotating body 22, as an input device, may be set in various modes according to the amount or direction of rotation of the rotating body 22.

The rotating body 22 is rotatably mounted on the first support structure 23 to enable the operation of the electronic device. The rotating body 22 having an annular shape includes a first surface 220, a second surface 222 opposite to the first surface 220, and an outer peripheral surface 221.

The support structures protect or support all components employed for the electronic device and are formed of at least one of an injection material and an alloy material. The support structures include the first support structure 23 (i.e., a first fixing part) and the second support structure 24 (i.e., a second fixing part). The support structures may also be referred to as coupling structures or fixing structures. The first support structure 23 is located externally and thus is referred to as an external structure, and the second support structure 24 is located internally and thus is referred to as an internal structure.

The first and second support structures 23 and 24 are vertically coupled to each other to support components that are mounted in the electronic device, are injection-molded so as to support electronic components, and are coupled in the shape of a cylinder or a rectangular parallelepiped, for example.

The first support structure 23 has a substantially hollow shape and includes a central region 231 and an outer circumferential region 230 around the central region. The central region 231, which is an open space, is a mounting space in which the second support structure 24 is accommodated. The central region 231 is a space in which the display (d) and the second support structure 24 are accommodated and arranged, wherein the display (d) is disposed on the upper surface of the second support structure 24. The outer circumferential region 230, which surrounds the central region 231, is a region in which the rotating body 22 is disposed, and is a surface that faces the bottom surface 222 of the rotating body 22.

The second support structure 24 is closed at the upper end thereof and open at the lower end thereof, and the power supply means B and the circuit component mounting part PCB are accommodated in the internal space of the second support structure 24. The power supply means B is mounted on the PCB, which includes a central processing unit, a wireless communication unit, a sensing unit, and an electrical connection unit.

The second support structure 24 is a housing that is vertically coupled to the first support structure 23, and a lower cover C is coupled to the lower end of the second support structure 24. In addition, the second support structure 24 has a recess 242 formed in an outer region thereof, in which the sensor unit 25 is disposed. The optical sensor 250 and the magnetic sensors 251 and 252 are positioned in the recess 242, are mounted on an electrical connection part, such as a flexible circuit board fl, and are electrically connected to the PCB through the flexible circuit board fl.

Figure 6:
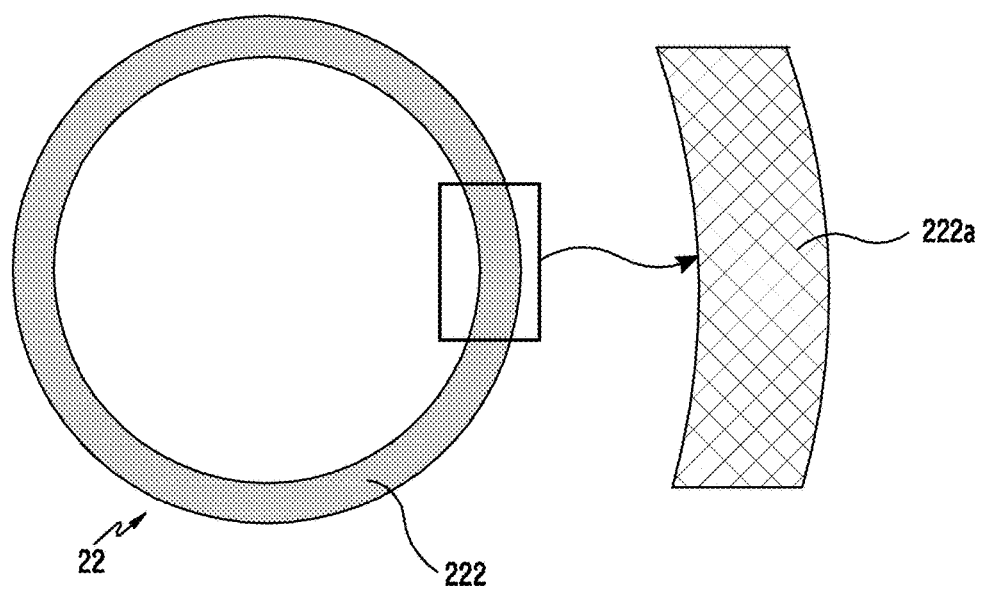
FIG. 6 illustrates an optical pattern formed on the bottom surface of a rotating body, according to embodiments of the present disclosure.

FIG. 6 illustrates an optical pattern formed on the bottom surface of the rotating body, according to embodiments of the present disclosure.

Referring to FIG. 6, the rotating body 22 has the optical pattern 222a imprinted on the bottom surface 222 thereof in a uniform pattern, by use of a laser. The amount or direction of rotation of the rotating body 22 is detected by the optical pattern 222a.

Figure 7A:
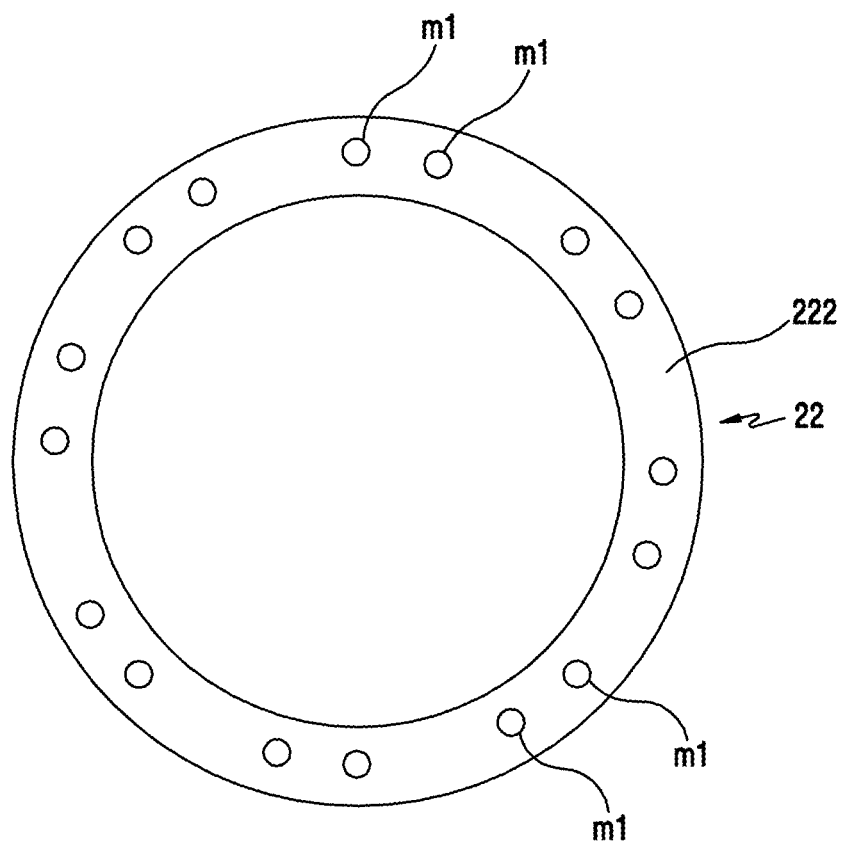
FIG. 7A illustrates the arrangement of a plurality of first magnetic materials that are provided on the rotating body, according to embodiments of the present disclosure.
Figure 7B:
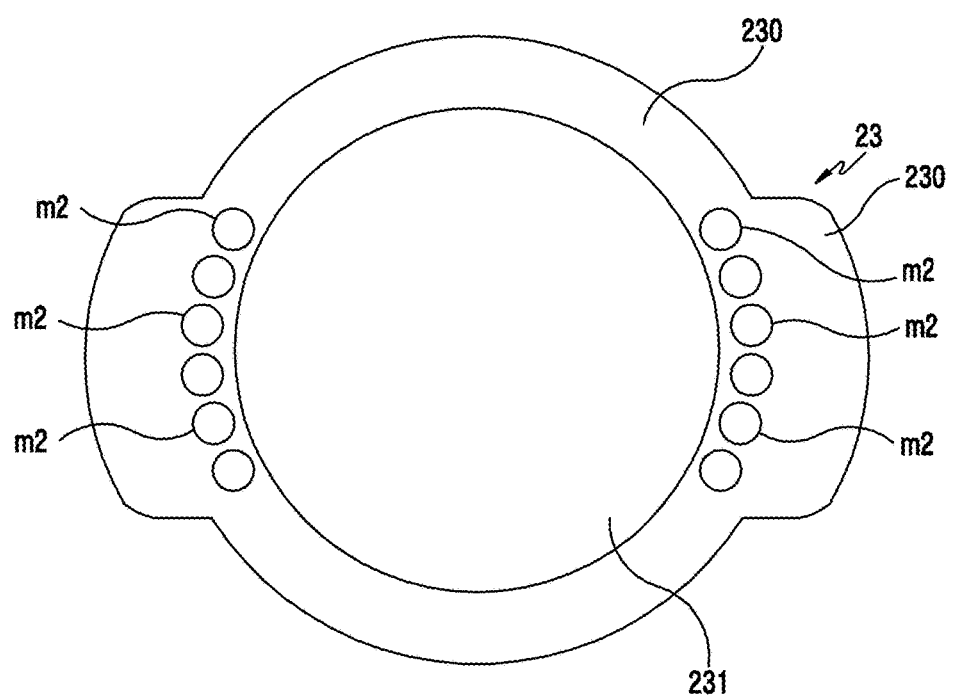
FIG. 7B illustrates the arrangement of a plurality of second magnetic materials that are provided in the outer circumferential region of a first support structure, according to embodiments of the present disclosure.
Figure 8:
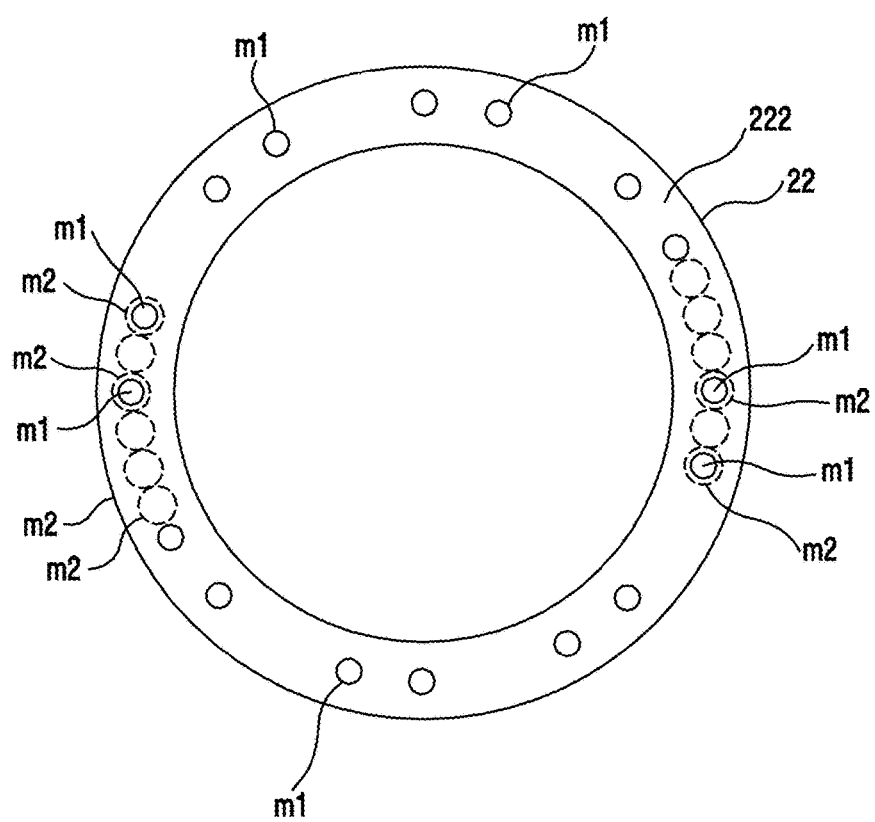
FIG. 8 illustrates the arrangement of the first and second magnetic materials when the rotating body is superposed on the outer peripheral region of the first support structure, according to embodiments of the present disclosure.

FIG. 7A illustrates the arrangement of a plurality of first magnetic materials that are provided on the rotating body, according to embodiments of the present disclosure. FIG. 7B illustrates the arrangement of a plurality of second magnetic materials that are provided in the outer circumferential region of the first support structure, according to embodiments of the present disclosure. FIG. 8 illustrates the arrangement of the first and second magnetic materials when the rotating body is superposed on the outer peripheral region of the first support structure, according to embodiments of the present disclosure.

Referring to FIGS. 7A, 7B, and 8, the first magnetic materials m1 and the second magnetic materials m2 are mounted on a portion of the rotating body 22 and a portion of the first support structure 23, respectively, which face each other. The rotating body 22 is mounted on the outer circumferential region 230 of the first support structure 23 to rotate clockwise or counterclockwise. While the rotating body 22 is rotating, a clicking sensation to the rotation of the rotating body 22 is generated by the operation of the first and second magnetic materials m1 and m2. In general, a repulsive force is generated between magnetic materials that have the same polarity, and an attractive force is generated between magnetic materials that have opposite polarities. By using the property of magnetic materials, the rotating body 22 generates a clicking sensation during the rotation.

Referring to FIG. 7A, the rotating body 22 has the first surface and the second surface 222 opposite to the first surface. The first surface faces an upper cover made of a ceramic material, which will be described below, and the second surface 222 faces the outer circumferential region of the first support structure. The rotating body 22 includes the plurality of first magnetic materials m1 that are accommodated individually or in pairs in the rotating body 22 so as to be spaced apart from each other along the circumferential direction of the rotating body 22. The first magnetic materials m1 are permanent magnets that have North and South poles, and are arranged at various intervals.

Referring to FIG. 7B, the first support structure has the plurality of second magnetic materials m2 arranged in the outer circumferential region 230 thereof. Particularly, the plurality of second magnetic materials m2 are accommodated in the first support structure so as to be spaced apart from each other along the circumferential direction of the outer circumferential region. The second magnetic materials m2 are permanent magnets that have North and South poles, and are arranged at various intervals in consideration of the arrangement of the first magnetic materials. The second magnetic materials m2 may have polarities identical to or different than the polarities of the first magnetic materials m1.

Figure 9:
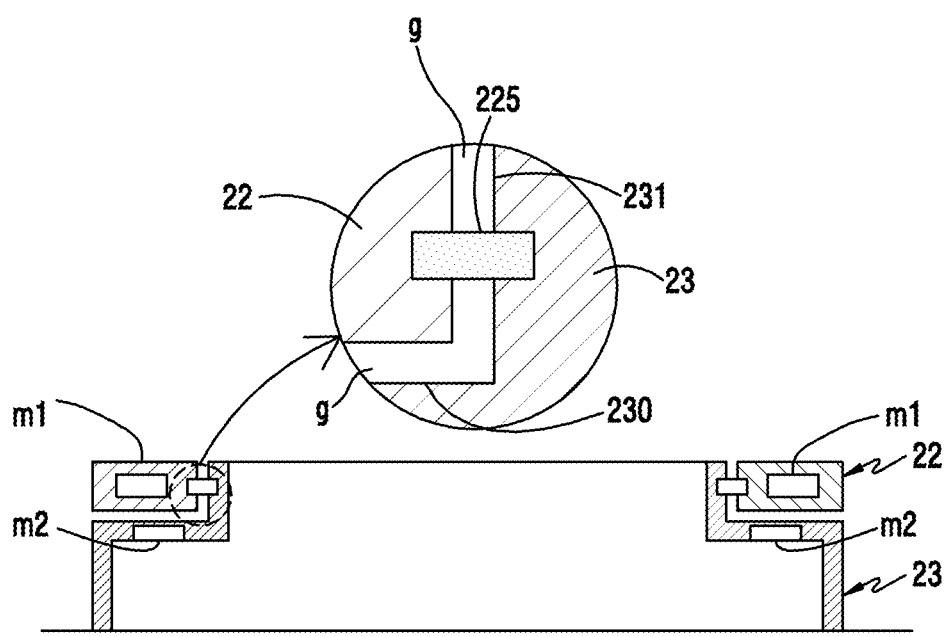
FIG. 9 is a cross-sectional view illustrating when the rotating body is mounted on the first support structure, according to embodiments of the present disclosure.

FIG. 9 is a cross-sectional view illustrating when the rotating body is mounted on the first support structure, according to embodiments of the present disclosure.

Referring to FIG. 9, the rotating body 22 is disposed above the first support structure 23 with a gap (g) between the rotating body 22 and first support structure 23. The rotating body 22 is mounted by a connecting member 225 so as to be spaced the gap (g) apart from the first and second surfaces 230 and 231 of the first support structure 23. The rotating body 22 is mounted so as to be rotatable while being restricted to the first support structure 23 by the connecting member 225, and so as to be suspended from the first support structure 23 by the connecting member 225.

The connecting member 225 has an annular shape and is formed of a metal material such as stainless steel. In addition, the outer peripheral portion of the connecting member 225 is connected to the rotating body 22, and the inner peripheral portion of the connecting member 225 is connected to the first support structure 23. The connecting member 225 is formed of a resilient material, or in a shape that promotes resilience. However, the rotating body may be directly coupled to the first support structure so as to be rotatable without the connecting member being between the rotating body and the first support structure.

Figure 10:
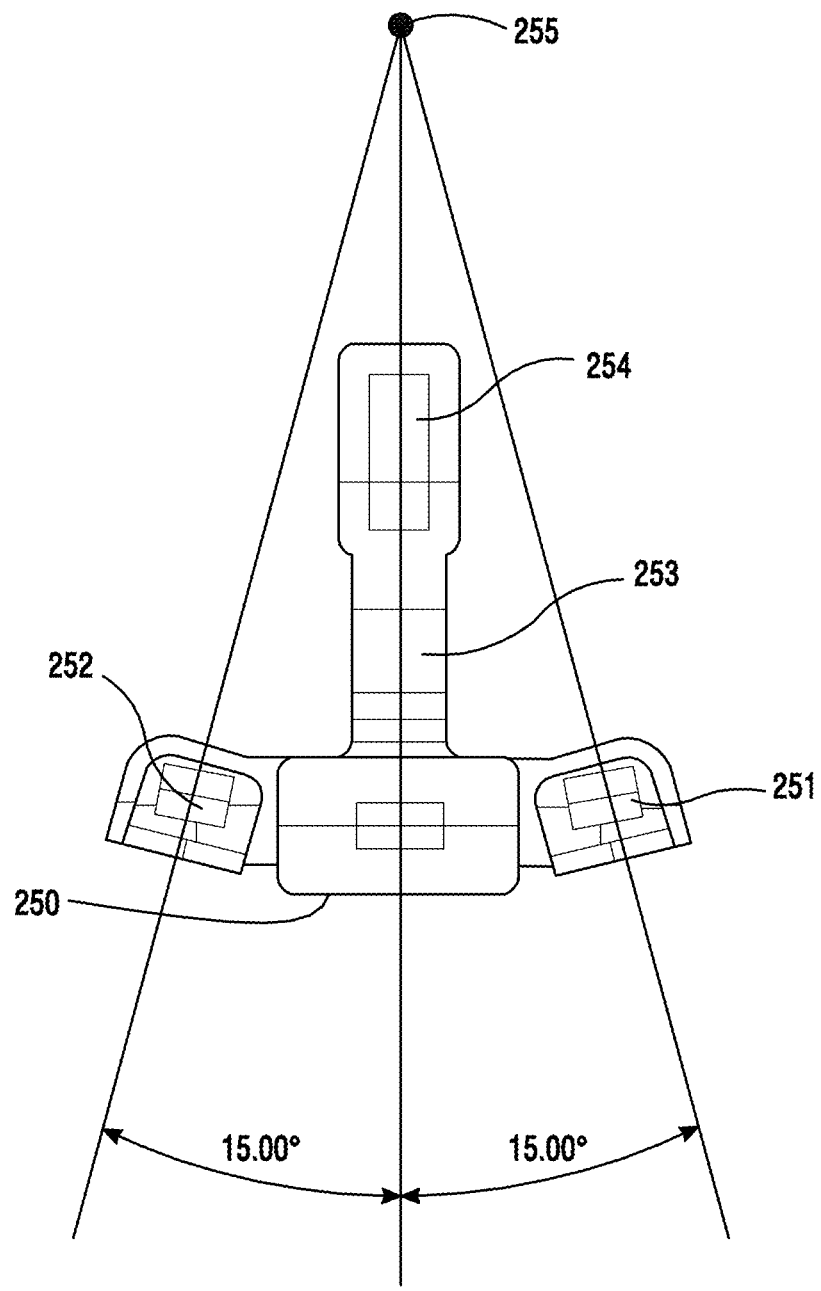
FIG. 10 illustrates an optical sensor and two magnetic sensors that constitute a sensor unit mounted on a support structure, according to embodiments of the present disclosure.

FIG. 10 illustrates the optical sensor and the two magnetic sensors that constitute the sensor unit mounted on the support structure, according to embodiments of the present disclosure.

Referring to FIG. 10, the sensor unit 25 includes the optical sensor 250 and the one or more magnetic sensors 251 and 252 as previously described. The sensor unit 25 includes the optical sensor 250 and the two magnetic sensors 251 and 252 that are disposed on the opposite sides of the optical sensor 250. For example, the optical sensor 250 may be an optical finger mouse (OFM), which will be described below. The magnetic sensors 251 and 252 include Hall sensors. The optical sensor 250 detects the amount or direction of rotation of the rotating body by using an optical pattern. The magnetic sensors 251 and 252 may be used to correct the rotation recognition value of the optical sensor 250 by detecting the magnetic forces applied by the first magnetic materials m1.

The sensor unit 25 includes the optical sensor 250, the first and second magnetic sensors 251 and 252, a flexible circuit board 253, and a connector 254. The optical sensor 250 and the first and second 251 and 252 are disposed on at least a part of the flexible circuit board 253, and the connector 254 is disposed on an end portion of the flexible circuit board 253. In this case, the optical sensor 250 and the two magnetic sensors 251 and 252 are arranged to be spaced apart from each other on a circumference that has a predetermined diameter with respect to the center of rotation 255, along the circumferential direction. The sensors are arranged on the flexible circuit board with a rotation angle of about 15 degrees therebetween.

Figure 11:
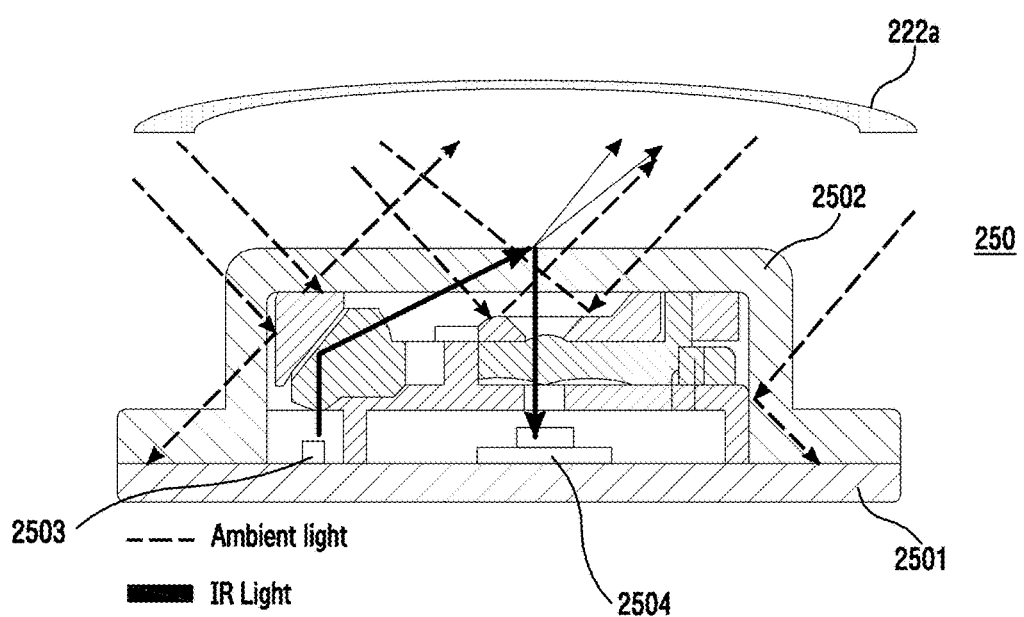
FIG. 11 is a cross-sectional view illustrating the configuration of an optical sensor unit according to embodiments of the present disclosure.

FIG. 11 is a cross-sectional view illustrating the configuration of an optical sensor according to embodiments of the present disclosure.

Referring to FIG. 11, the optical sensor 250 includes a substrate 2501, a housing 2502, a light emitting part 2503, and a light receiving part 2504. The optical sensor 250 determines the rotation of the rotating body through image processing when the light emitted from the light emitting part 2503 travels through a plurality of waveguide members and thereafter, is input to the light receiving part 2504 by reflection from the optical pattern 222a. Concurrently, the magnetic sensors detect the magnetic forces generated by the first magnetic materials of the rotating body. In this case, the optical sensor 250 may be used to correct the rotation recognition value using the magnetic forces of the first magnetic materials that are detected by the magnetic sensors.

The optical sensor and the magnetic sensors of the sensor unit 25 have operating states, such as IDLE, RDY (sleep), and OFF. In optical sensor 250, IDLE refers to when the light emitting part and the light receiving part of the sensor are operating, and RDY refers to when the light emitting part and the light receiving part are not in operation. The light emitting part and the light receiving part not in operation may be activated into an IDLE state by an external wake-up signal that is generated by execution of an App and an OS.

Figure 12:
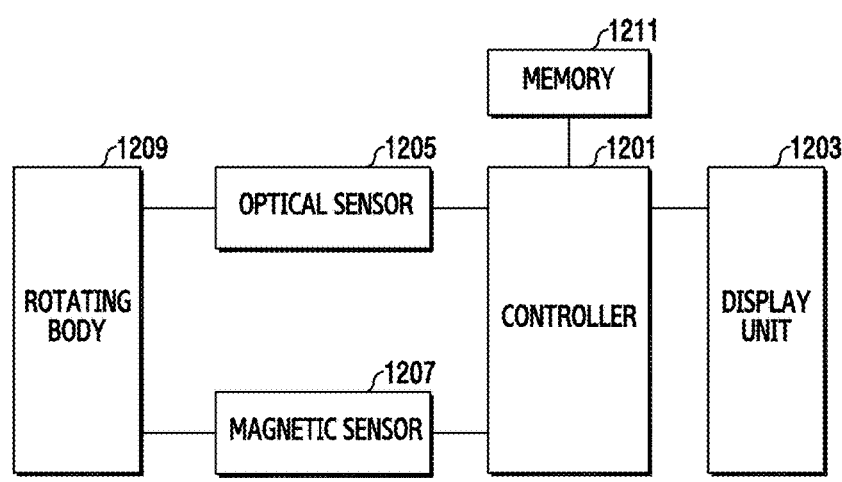
FIG. 12 is a block diagram of a configuration for correcting a rotation recognition value of an optical sensor using a magnetic force detected by a magnetic sensor, according to embodiments of the present disclosure.

FIG. 12 is a block diagram of an electronic device according to an embodiment of the present disclosure.

Referring to FIG. 12, the electronic device includes a controller 1201, a display unit 1203, an optical sensor 1205, a magnetic sensor 1207, a rotating body 1209, and a memory 1211. In some embodiments, the electronic device may omit at least one of the elements or may further include additional elements.

The display unit 1203 provides various screen interfaces required to operate the electronic device. For example, the display 1205 includes an LCD, an LED, an OLED, MEMS, or an electronic paper display. The display unit 1203 displays various types of content, such as text, an image, a video, an icon, and a symbol, and includes a touch screen that detects a touch, gesture, proximity, or hovering input using an electronic pen or a user's body part.

The memory 1211 includes a volatile memory and/or a non-volatile memory. The memory 1211 stores instructions or data relevant to at least one other element of the electronic device, and may store software and/or a program. The program includes a kernel, middleware, an API, and/or an application. At least a part of the kernel, the middleware, or the API may be referred to as an OS.

For example, the memory 1211 stores, in advance, reference values for outputting different screens according to the speed of rotation of the rotating body, and a signal table for estimating the direction of rotation of the rotating body based on a signal output from the magnetic sensor 1207.

The optical sensor 1205 projects an optical signal through a light emitting part and receives, through a light receiving part, an optical signal that is reflected from an optical pattern attached to one surface of the rotating body. The optical sensor 1205 converts the received optical signal into an electrical signal and outputs the converted electrical signal to the controller 1201, by using a communication scheme, such as I2C.

The magnetic sensor 1207 detects a magnetic force of a specific region, converts the detected magnetic force into an electrical signal, and outputs the converted electrical signal to the controller 1201. For example, the magnetic sensor 1207 includes two sensors that detect magnetic forces of different regions.

The controller 1201 drives an operating system or an application program to control a plurality of hardware or software elements connected thereto and performs various types of data processing and operations. For example, the controller 1201 may be embodied as an SoC. The controller 1201 may further include a GPU and/or an image signal processor. The controller 1201 loads instructions or data received from one of the other elements, such a non-volatile memory of the memory 1211, in a volatile memory of the memory 1211, processes the loaded instructions or data, and stores various data in the non-volatile memory.

The controller 1201 determines the rotation value of the rotating body based on an output signal received from the optical sensor 1205 and an output signal received from the magnetic sensor 1207, and outputs a screen that corresponds to the determined rotation value.

In an embodiment, the controller 1201 receives a first output signal from the optical sensor 1205. The first output signal refers to an electrical signal generated by the optical sensor 1205.

The controller 1201 analyzes the first output signal to identify whether the rotating body has rotated. For example, the controller 1201 performs an image processing operation on the first output signal to identify an optical pattern and compares the identified optical pattern with the previously stored optical pattern. If the comparison reveals that the optical patterns are identical to each other, the controller 1201 determines that the rotating body has not rotated, and if not identical, the controller 1201 determines that the rotating body has rotated.

When it is determined that the rotating body has not rotated, the controller 1101 repeats the step of receiving the first output signal from the optical sensor 1205.

If it is determined that the rotating body has rotated, the controller 1201 estimates the rotation value based on the first output signal. The rotation value includes the amount and direction of rotation of the rotating body. The amount of rotation may be the angle of rotation. For example, the controller 1201 estimates the amount and direction of rotation based on the current optical pattern, which has been identified through the analysis of the first output signal, and the previous optical pattern.

The controller 1201 receives second and third output signals from the magnetic sensor, and estimates an auxiliary rotation value based on the second and third output signals. The auxiliary rotation value includes the amount and direction of auxiliary rotation of the rotating body, which may be the angle of auxiliary rotation.

Figure 13:
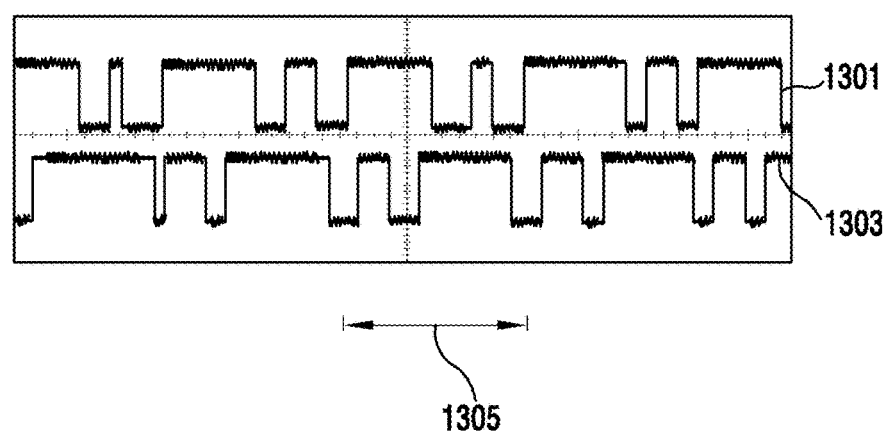
FIG. 13 is a graph illustrating waveforms when a rotating body rotates in the counterclockwise direction, according to embodiments of the present disclosure.

For example, the controller 1201 estimates the direction of auxiliary rotation based on the waveform values of the second and third output signals. More specifically, when the waveforms of the second and third output signals change as indicated by reference numerals 1301 and 1303 of FIG. 13, the controller 1201 determines the second and third output signal values for a period 1305 as listed in Table 1, as follows.

TABLE 1

| Signal Value | Second Output Signal | Third Output Signal |
|---|---|---|
| | 0 | 0 |
| | 1 | 1 |

TABLE 1-continued

| Signal Value | Second Output Signal | Third Output Signal |
|---|---|---|
| | 1 | 0 |
| | 0 | 1 |
| | 1 | 1 |
| | 0 | 1 |
| | 0 | 0 |

In this case, the controller 1201 determines that the rotating body rotates in the counterclockwise direction. That is, referring also to FIG. 14, which is a signal table illustrating the operating method of the magnetic sensor, such as a Hall IC, according to embodiments of the present disclosure, Table 1 is included in a signal table 1309 for counterclockwise rotation in a signal table 1307 stored in the memory 1211.

In another example, the controller 1201 estimates the amount of auxiliary rotation of the rotating body in consideration of the second and third output signals and the angles of magnets that are attached to the rotating body.

The controller 1201 determines the final rotation value based on the rotation value and the auxiliary rotation value. For example, when the rotational direction of the rotation value is the clockwise direction, and the auxiliary rotational direction of the auxiliary rotation value is the counterclockwise direction, the controller 1201 determines the direction of rotation of the rotating body to be the counterclockwise direction according to the auxiliary rotation value.

The controller 1201 selects one of the user modes of the electronic device based on the final rotation value and displays a screen for the selected mode. The user modes refer to various modes that the electronic device can provide, and include a telephone call mode, an exercise mode, and a sleep mode, for example. That is, if the exercise mode is selected, the controller 1201 displays a screen or emits voice informing that the current mode is the exercise mode.

As described above, the controller 1201 accurately selects the user mode according to the rotation of the rotating body by determining the final rotation value based on the output signal received from the optical sensor 1205 and the output signal output from the magnetic sensor 1207.

In another embodiment, the controller 1201 estimates the speed of rotation of the rotating body, such as using an acceleration sensor provided on the electronic device, or measures the speed of rotation of the rotating body based on an output signal received from the optical sensor 1205.

The controller 1201 compares the speed of rotation with a first reference value. When the comparison reveals that the speed of rotation is equal to, or less than, the first reference value, the controller 1201 receives a fourth output signal from the optical sensor 1205 and estimates the rotation value based on the received fourth output signal.

The controller 1201 selects one of the user modes provided by the electronic device according to the rotation value and outputs a screen that corresponds to the selected mode.

The controller 1201 receives fifth and sixth output signals from the magnetic sensor 1207 and analyzes the received output signals. Based on the analysis result, the controller 1201 determines whether an event for the magnetic sensor 1207 has occurred. The event refers to detecting, by the magnetic sensor 1207, a magnet attached to the rotating body.

When the identification result reveals that the event has occurred, the controller 1201 may completes switching of the screen. When this result reveals that no event has occurred, the controller 1201 repeats the step of receiving the fourth output signal from the optical sensor 1205 until an event occurs.

When the speed of rotation exceeds the first reference value, the controller 1201 compares the speed of rotation with a second reference value. When the comparison reveals that the speed of rotation is equal to, or less than, the second reference value, the controller 1201 receives a sixth output signal from the optical sensor 1205 and estimates the rotation value based on the received sixth output signal.

According to the rotation value, the controller 1201 selects one of the lists that the electronic device can provide. For example, the lists may be telephone call or message lists.

The controller 1201 receives seventh and eighth output signals from the magnetic sensor 1207 and analyzes the received seventh and eighth output signals to identify the number of events.

The controller 1201 selects and displays one of a plurality of menus included in the list according to the number of events. For example, when 100 menus are included in the list, and the number of events is 1, the controller 1201 selects the tenth menu from all the menus and displays the selected menu.

When the speed of rotation exceeds the second reference value, the controller 1201 receives a seventh output signal from the optical sensor 1205 and estimates the rotation value based on the received seventh output signal.

According to the rotation value, the controller 1201 selects one of the lists that the electronic device can provide. The controller 1201 selects and displays the last of a plurality of menus included in the selected list.

As described above, the controller 1201 outputs different screens according to the speed of rotation.

Figure 15:
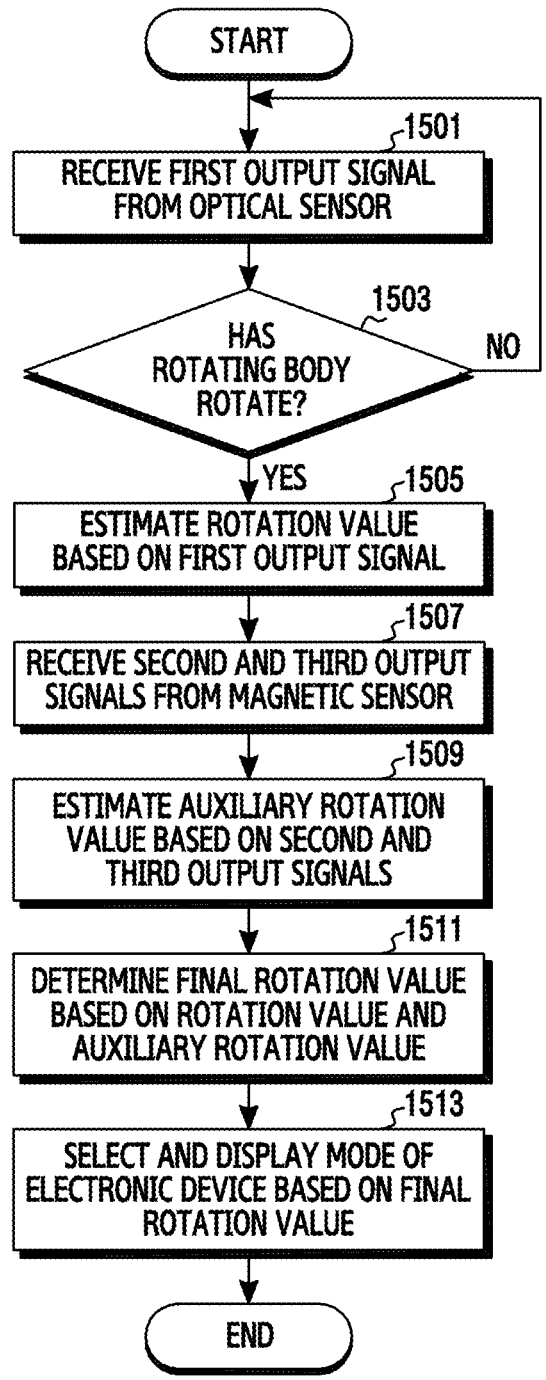
FIG. 15 is a flowchart illustrating a process of selecting and displaying a mode according to the rotation of a rotating body in an electronic device, according to a first embodiment of the present disclosure.

FIG. 15 is a flowchart illustrating a process of selecting and displaying a mode according to the rotation of the rotating body in the electronic device, according to a first embodiment of the present disclosure.

Referring to FIG. 15, in step 1501, the controller (e.g., controller 1201 in FIG. 12) receives a first output signal from the optical sensor 1105. The first output signal refers to an electrical signal generated by the optical sensor 1205.

In step 1503, the controller analyzes the first output signal to determine whether the rotating body has rotated. For example, the controller performs an image processing operation on the first output signal to identify an optical pattern and compares the identified optical pattern with the previously stored optical pattern. If the comparison reveals that the optical patterns are identical to each other, the controller determines that the rotating body has not rotated, and if not, the controller determines that the rotating body has rotated.

If it is determined that the rotating body has rotated, the controller proceeds to step 1505, and if not, the controller repeats step 1501.

When proceeding to step 1505, the controller estimates the rotation value based on the first output signal. The rotation value includes the amount and direction of rotation of the rotating body. The amount of rotation may be the angle of rotation. For example, the controller estimates the amount and direction of rotation based on the current optical pattern, which has been identified through the analysis of the first output signal, and the previous optical pattern.

In step 1507, the controller receives second and third output signals from the magnetic sensor. In step 1509, the controller estimates an auxiliary rotation value based on the second and third output signals. The auxiliary rotation value includes the amount and direction of auxiliary rotation of the rotating body. The amount of auxiliary rotation may be the angle of auxiliary rotation.

For example, the controller estimates the direction of auxiliary rotation based on the waveform values of the second and third output signals. More specifically, when the waveforms of the second and third output signals change as indicated by reference numerals 1301 and 1303 of FIG. 13, the controller determines the second and third output signal values for period 1205 as listed in Table 1.

In this case, the controller determines that the rotating body rotates in the counterclockwise direction. That is, referring back to FIG. 14, Table 1 is included in the signal table 1309 for counterclockwise rotation in the signal table 1307 that is stored in the memory 1211.

In another example, the controller estimates the amount of auxiliary rotation of the rotating body in consideration of the second and third output signals and the angles of magnets that are attached to the rotating body.

In step 1511, the controller determines the final rotation value based on the rotation value and the auxiliary rotation value. For example, when the rotational direction of the rotation value is the clockwise direction, and the auxiliary rotational direction of the auxiliary rotation value is the counterclockwise direction, the controller determines the direction of rotation of the rotating body to be the counterclockwise direction according to the auxiliary rotation value.

In step 1513, the controller selects one of the user modes of the electronic device based on the final rotation value and displays a screen for the selected mode. The user modes refer to various modes that the electronic device can provide, such as a telephone call mode, an exercise mode, and a sleep mode. For example, if the exercise mode is selected, the controller 1201 displays a screen or emits voice to inform that the current mode is the exercise mode.

Figure 16:
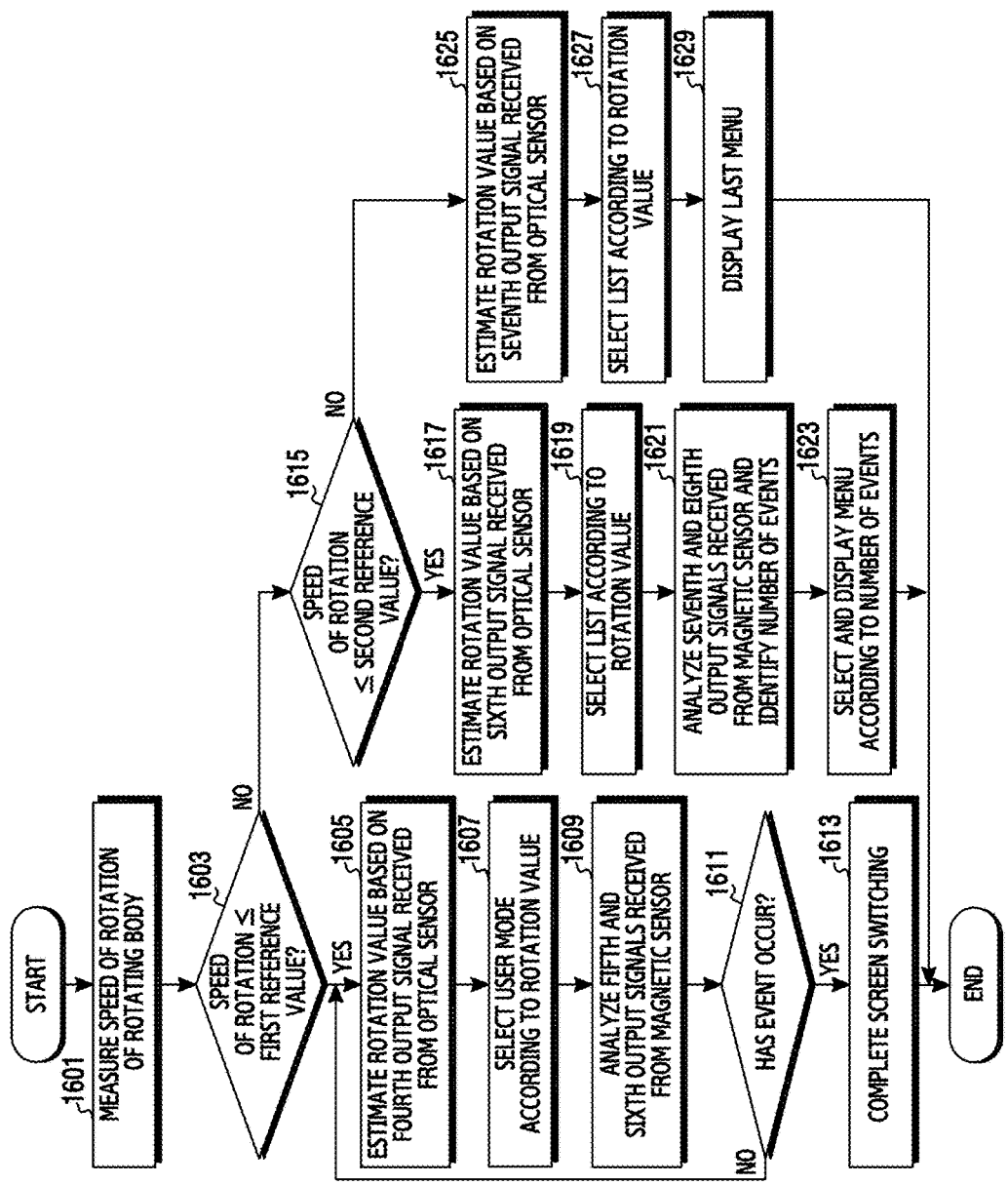
FIG. 16 is a flowchart illustrating a process of selecting and displaying a mode according to the rotation of a rotating body in an electronic device, according to a second embodiment of the present disclosure.

FIG. 16 is a flowchart illustrating a process of selecting and displaying a mode according to the rotation of the rotating body in the electronic device, according to a second embodiment of the present disclosure.

Referring to FIG. 16, in step 1601, the controller measures the speed of rotation of the rotating body, such as by using an acceleration sensor provided on the electronic device, or based on an output signal received from the optical sensor.

In step 1603, the controller compares the speed of rotation with a first reference value. If the comparison reveals that the speed of rotation is equal to, or less than, the first reference value, the controller proceeds to step 1605, and if the speed of rotation is greater than the first reference value, the controller proceeds to step 1615.

When proceeding to step 1605, the controller receives a fourth output signal from the optical sensor, and estimates the rotation value based on the received fourth output signal. The rotation value includes the direction and amount of rotation of the rotating body.

In step 1607, the controller selects one of the user modes provided by the electronic device according to the rotation value, and outputs a screen that corresponds to the selected mode.

In step 1609, the controller receives fifth and sixth output signals from the magnetic sensor, and analyzes the received output signals. In step 1611, based on the analysis result, the controller determines whether an event for the magnetic sensor has occurred. The event refers to detecting, by the magnetic sensor, a magnet attached to the rotating body.

If it is determined that the event has occurred, the controller proceeds to step 1613, and if not, the controller repeats step 1605. If proceeding to step 1613, the controller completes switching of the screen.

If proceeding to step 1615, the controller 1201 compares the speed of rotation with a second reference value. If the comparison reveals that the speed of rotation is equal to, or less than, the second reference value, the controller proceeds to step 1617, and if not, the controller 1201 may proceed to step 1625.

If proceeding to step 1617, the controller receives a sixth output signal from the optical sensor 1205, and estimates the rotation value based on the received sixth output signal.

In step 1619, according to the rotation value, the controller selects one of the lists that the electronic device can provide. For example, the lists may be telephone call or message lists.

In step 1621, the controller receives seventh and eighth output signals from the magnetic sensor, and analyzes the received seventh and eighth output signals to determine the number of events:

In step 1623, the controller selects and displays one of a plurality of menus included in the list according to the number of events. For example, when 100 menus are included in the list, and the number of events is 1, the controller selects the tenth menu from all the menus and displays the selected menu.

If proceeding to step 1625, the controller receives a seventh output signal from the optical sensor, and estimates the rotation value based on the received seventh output signal.

In step 1627, according to the rotation value, the controller selects one of the lists that the electronic device can provide. In step 1629, the controller selects and displays the last of a plurality of menus included in the selected list.

Figure 17:
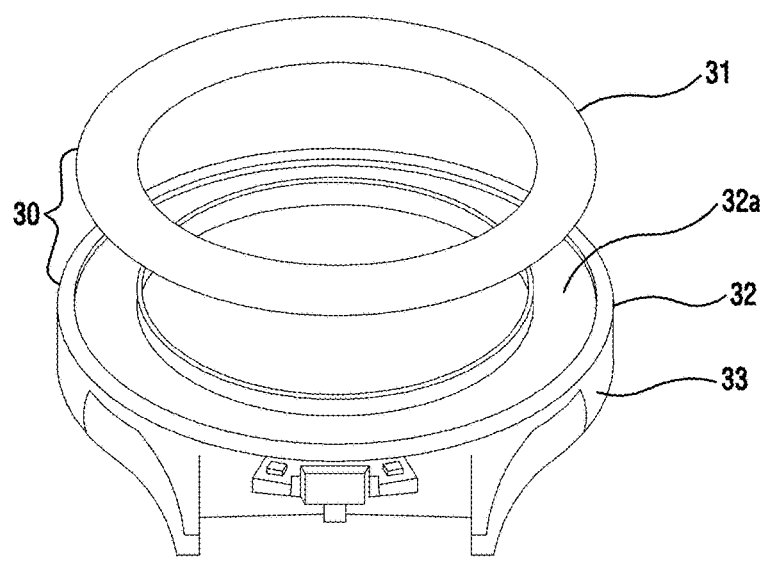
FIG. 17 is a perspective view of another rotating body according to embodiments of the present disclosure.
Figure 18:
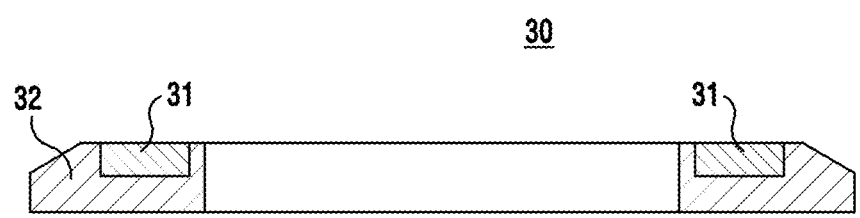
FIG. 18 is a cross-sectional view illustrating when an upper cover is coupled to the rotating body, according to embodiments of the present disclosure.

FIG. 17 is a perspective view of another rotating body according to embodiments of the present disclosure, and FIG. 18 is a cross-sectional view illustrating when an upper cover is coupled to the rotating body, according to embodiments of the present disclosure.

Referring to FIGS. 17 and 18, an electronic device includes a rotating body 30 constituted by two pieces. The rotating body 30 is mounted on a first support structure 33 and enters various modes according to the amount or direction of rotation thereof. The rotating body 30 includes an upper cover 31 exposed to the outside and a rotating operation body 32. The upper cover 31 is vertically coupled to the rotating operation body 32 to integrally rotate with the rotating operation body 32. The upper cover 31 is formed of a ceramic material or a synthetic resin. The rotating body 30 has a plurality of first magnetic materials that are disposed on the upper cover 31 or the rotating operation body 32. The rotating operation body 32 has a receiving space 32*a* in which the upper cover is positioned:

The upper cover 31 includes an indicator that visually indicates the amount or direction of rotation of the rotating body 30. The indicator may be marked or imprinted on the upper cover 31, or may be displayed through a printing method.

Figure 19:
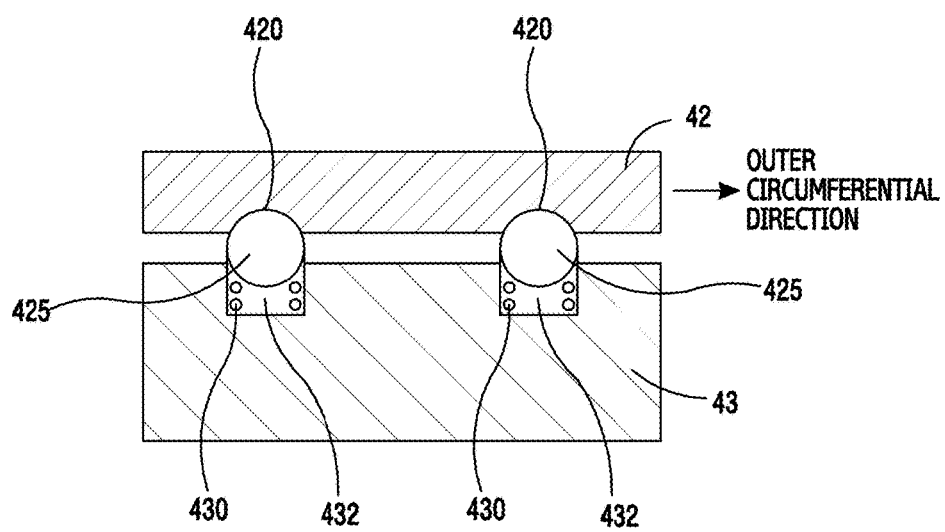
FIG. 19 is a cross-sectional view of a mechanical structure that generates a clicking sensation to the rotation of a rotating body, according to embodiments of the present disclosure.

FIG. 19 is a cross-sectional view of a mechanical structure that generates a clicking sensation to the rotation of a rotating body, according to embodiments of the present disclosure.

Referring to FIG. 19, an electronic device uses a plurality of balls 425, instead of a plurality of magnetic materials, in order to generate a clicking sensation to the rotation of a rotating body 42. A support structure 43 of the electronic device has a plurality of recesses 432 formed therein in order for the plurality of balls 425 to be arranged to be spaced apart from each other in the outer peripheral region of the support structure 43. Resilient members 430 are disposed in the recesses 432 to support the accommodated balls 425, respectively. The rotating body 42 has a plurality of recesses 420 that are formed in the rear surface thereof so as to be spaced apart from each other, and a part of each ball 425 is inserted into the corresponding recess. A clicking sensation to the rotation of the rotating body 42 is generated when the balls 425 are engaged with, or disengaged from, the respective recesses 420. When the rotating body 42 rotates, the balls 425 move upward and downward in the recesses 432, respectively.

The electronic device performs various corresponding functions according to the rotated position of the rotating body, thereby providing various UIs using a single input device.

The above described components of the electronic device according to embodiments of the present disclosure may be formed of one or more components, and a name of a corresponding component element may be changed based on the type of electronic device. In embodiments of the present disclosure, the electronic device may include at least one of the above-described elements, and may exclude some of the elements or further include additional elements. Some of the components of the electronic device according to the embodiments of the present disclosure may be combined to form a single entity, and thus, may equivalently execute functions of the corresponding elements prior to the combination.

The "module" used in embodiments of the present disclosure may refer to a "unit" including one of hardware, software, and firmware, or a combination of two or more of the hardware, software, and firmware. The "module" may be interchangeable with a term, such as a unit, a logic, a logical block, a component, or a circuit, may be a minimum unit of an integrated component element or a part thereof, and may be a minimum unit for performing one or more functions or a part thereof. The "module" may be mechanically or electronically implemented. For example, the "module" according to embodiments of the present disclosure may include at least one of an application-specific integrated circuit (ASIC) chip, a field-programmable gate array (FPGA), and a programmable-logic device for performing operations which have been known or are to be developed in the future.

At least some of the devices or methods according to the embodiments of the present disclosure may be implemented as instructions stored computer readable storage media in the form of programming modules. When the command is executed by one or more processors, the one or more processors may execute a function corresponding to the command. The computer-readable storage medium may be the memory 1430, for example. At least a part of the programming module may be implemented by the processor 210. At least some of the programming modules may include a module, a program, a routine, a set of instructions or a process for performing one or more functions.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of embodiments of the present disclosure, and vice versa.

A module or a programming module according to the present disclosure may include at least one of the described component elements, a few of the component elements may be omitted, or additional component elements may be included. Operations executed by a module, a programming module, or other component elements according to embodiments of the present disclosure may be executed sequentially, in parallel, repeatedly, or in a heuristic manner. Some operations may be executed according to another order or may be omitted, or other operations may be added.

The embodiments of the present disclosure are provided in order to easily describe the technical matters of the present disclosure and assist with comprehension of the present disclosure, and do not limit the scope of the present disclosure. Therefore, in addition to the embodiments disclosed herein, the scope of the embodiments of the present disclosure should be construed to include all modifications or modified forms drawn based on the technical idea of the embodiments of the present disclosure.

While the present disclosure has been shown and described with reference to certain embodiments thereof, it will be understood by those skilled in the art that various changes in form and details may be made therein without departing from the spirit and scope of the disclosure as defined by the following claims and their equivalents.

What is claimed is:

1. An electronic device comprising:
a rotating body; and
a fixed body to which the rotating body is coupled and rotates,
wherein a first magnetic material and a second magnetic material are disposed on the rotating body and the fixed body, respectively, such that a clicking sensation to the rotation of the rotating body is generated by a magnetic force between the first and second magnetic materials, and an optical sensor and one or more magnetic sensors are disposed on the fixed body such that an amount, a direction, or a speed of rotation of the rotating body is recognized by the optical sensor,
wherein the one or more magnetic sensors detect the magnetic force,
wherein a value of the amount, direction or speed of rotation recognized by the optical sensor is corrected by using the magnetic force of the first magnetic material that is detected by the magnetic sensors, and
wherein the one or more magnetic sensors are disposed on opposite sides of the optical sensor and are used to detect the magnetic forces generated from the first magnetic material and to correct the value of the amount and direction of the rotation recognized by the optical sensor.

2. The electronic device of claim 1, wherein the first and second magnetic materials are disposed to face each other, and the optical sensor is disposed on the fixed body along a vicinity of a rotational path of the rotating body.

3. The electronic device of claim 1, wherein the fixed body comprises:
a support structure that has the optical sensor, the one or more magnetic sensors disposed separate from the optical sensor, and the second magnetic material is provided along an outer circumferential direction of the support structure, the rotating body being coupled to the support structure and rotatable about the support structure.

4. The electronic device of claim 3, wherein the rotating body is a ring-shaped bezel that has upper and lower surfaces and has a uniform optical pattern imprinted on the lower surface, and the first magnetic material is accommodated in the rotating body and is uniformly or non-uniformly spaced apart.

5. The electronic device of claim 3, wherein the support structure further comprises:
 a first support structure that has a central portion that is open at a top and a bottom and an outer peripheral portion on which the rotating body is placed; and
 a second support structure that is coupled to the first support structure,
 wherein the optical sensor and the one or more magnetic sensors are disposed on the second structure.

6. The electronic device of claim 5, wherein a display is accommodated in the central portion of the first support structure and is exposed outside of the electronic device while being mounted on the second support structure.

7. The electronic device of claim 5, wherein the rotating body is directly mounted on the first support structure, or is indirectly mounted on the first support structure through a resilient member or a metal member with a gap between the rotating body and the first support structure.

8. The electronic device of claim 3, wherein a ceramic cover is integrally coupled to the rotating body.

9. The electronic device of claim 3, wherein the electronic device is a wearable device that is worn on a wrist of a user by using a strap.

10. The electronic device of claim 3, wherein the electronic device is a wearable device, wherein the wearable device con rises:
 a main body; and
 a connecting part connected to the main body and worn on a human body, and
 wherein the main body comprises:
  the rotating body provided with an optical pattern and the first magnetic material;
  the support structure provided with the second magnetic material, the optical sensor, and the one or more magnetic sensors and disposed to face the rotating body;
  a display mounted on the support structure and disposed to be exposed outside of the wearable device;
  a power supply unit disposed in the support structure; and
  a lower cover coupled to a bottom of the support structure.

11. The electronic device of claim 1, further comprising:
 a support structure rotatably disposed to face the rotating body and comprising an optical module that is disposed to face the optical pattern,
 wherein a plurality of balls are disposed in and are resiliently supported by an outer peripheral region of the support structure, and a plurality of recesses, in which each of the plurality of balls are positioned when the rotating body rotates, are formed in a surface of the rotating body, and a clicking sensation to the rotation of the rotating body is generated by engagement or disengagement between the balls and the recesses when the rotating body rotates.

12. A device for controlling an electronic device, comprising:
 an optical sensor that receives an optical signal reflected from a rotating body in a rotary motion;
 one or more magnetic sensors that detect a magnetic force of at least one magnet attached to the optical sensor and that generates a magnetic force signal using the detected magnetic force;
 a controller that estimates a rotation value of the rotating body based on the optical signal, estimates an auxiliary rotation value of the rotating body based on the magnetic force signal, determines a final rotation value by reflecting the auxiliary rotation value in the rotation value, and determines a mode of the electronic device according to the final rotation value; and
 a fixed body to which the rotating body is coupled and rotates,
 wherein a first magnetic material and a second magnetic material are disposed on the rotating body and the fixed body, respectively,
 wherein a value of an amount, a direction or a speed of rotation recognized by the optical sensor is corrected by using a magnetic force of the first magnetic material that is detected by the magnetic sensors, and
 wherein the magnetic sensors are disposed on opposite sides of the optical sensor and are used to detect the magnetic forces generated from the first magnetic material and to correct the value of the amount and direction of the rotation recognized by the optical sensor.

13. The device of claim 12, wherein the final rotation value comprises an amount and direction of rotation of the rotating body.

14. A method of controlling an electronic device, comprising:
 rotating a body which is coupled to a fixed body, wherein a first magnetic material is disposed on the rotating body and a second magnetic material is disposed on the fixed body such that a clicking sensation to the rotation of the rotating body is generated by a magnetic force between the first and second magnetic materials, and wherein an optical sensor and one or more magnetic sensors are disposed on the fixed body such that an amount, a direction, or a speed of rotation of the rotating body is recognized by the optical sensor;
 estimating a rotation value of the rotating body based on an optical signal reflected from the rotating body in a rotary motion;
 estimating an auxiliary rotation value of the rotating body based on a signal obtained by detecting a magnetic force signal;
 determining a final rotation value by reflecting the auxiliary rotation value in the rotation value; and
 controlling the electronic device according to the final rotation value,
 wherein a value of the amount, direction or speed of rotation recognized by the optical sensor is corrected by using the magnetic force of the first magnetic material that is detected by the magnetic sensors, and
 wherein the one or more magnetic sensors are disposed on opposite sides of the optical sensor and are used to detect the magnetic forces generated from the first magnetic material and to correct the value of the amount and direction of the rotation recognized by the optical sensor.

15. The method of claim 14, wherein the final rotation value comprises an amount and direction of rotation of the rotating body.

16. An electronic device comprising:
 an outer housing that has a first surface, and a second surface opposite to the first surface;

an opening formed in the first surface;

a bezel that surrounds an outer periphery of the opening and is rotatably supported by the first surface; and at least one electronic component accommodated in the outer housing, wherein the bezel comprises one or more magnets disposed separate from each other and a pattern formed on a surface of the bezel that is directed towards the outer housing, wherein the outer housing comprises a part adjacent to the bezel, the part including at least one magnetic force detection sensor that detects the one or more magnets and an optical sensor that optically detects the pattern, wherein a first magnetic material and a second magnetic material are disposed on the bezel and the outer housing, respectively, wherein a value of an amount, a direction or a speed of rotation recognized by the optical sensor is corrected by using a magnetic force of the first magnetic material that is detected by the magnetic force detecting sensors, and wherein the magnetic force detection sensors are disposed on opposite sides of the optical sensor and are used to detect the magnetic forces generated from the first magnetic material and to correct the value of the amount and direction of the rotation recognized by the optical sensor.

17. The electronic device of claim 16, wherein the electronic component comprises:

a processor electrically connected to the at least one magnetic force detection sensor and the optical sensor;

a display electrically connected to the processor and disposed in the opening; and a memory electrically connected to the processor, wherein the memory stores an instruction that causes the processor to change an image that is displayed on the display, in response to a signal from at least one of the optical sensor and the at least one magnetic force detection sensor when being executed.

* * * * *